(12) United States Patent
Suenaga et al.

(10) Patent No.: US 7,435,274 B2
(45) Date of Patent: Oct. 14, 2008

(54) METAL PARTICLE-DISPERSED COMPOSITE OXIDES, METAL PARTICLE-DISPERSED COMPOSITE OXIDE-SINTERED BODIES, METHOD OF MANUFACTURING METAL PARTICLE-DISPERSED COMPOSITE OXIDES, AND HYDROCARBON-BASED FUEL REFORMER

(75) Inventors: Seiichi Suenaga, Yokohama (JP);
Tomohiro Suetsuna, Nagoya (JP);
Takayuki Fukasawa, Kawasaki (JP);
Yasuhiro Goto, Tokyo (JP); Koichi Harada, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 719 days.

(21) Appl. No.: 10/786,286

(22) Filed: Feb. 26, 2004

(65) Prior Publication Data

US 2004/0168367 A1    Sep. 2, 2004

(30) Foreign Application Priority Data

| Feb. 27, 2003 | (JP) | ............................ 2003-051357 |
| Sep. 3, 2003 | (JP) | ............................ 2003-311493 |
| Sep. 30, 2003 | (JP) | ............................ 2003-342172 |

(51) Int. Cl.
- *B01J 8/00* (2006.01)
- *B01J 35/02* (2006.01)
- *B01J 23/00* (2006.01)
- *B01J 21/00* (2006.01)
- *B01J 20/00* (2006.01)

(52) U.S. Cl. ...................... 48/127.9; 422/222; 502/326; 502/327; 502/328; 502/331; 502/335; 502/337; 502/344; 502/345; 502/346; 502/355; 502/415; 502/439; 502/527.12

(58) Field of Classification Search ................. 502/439, 502/527.12, 326, 327, 328, 331, 335, 337, 502/344, 345, 346, 355, 415; 48/127.9; 422/222
See application file for complete search history.

(56) References Cited

U.S. PATENT DOCUMENTS

| 4,533,584 A | * | 8/1985 | Takeuchi et al. ............. 428/116 |
| 4,749,671 A | * | 6/1988 | Saito et al. ..................... 502/64 |

(Continued)

FOREIGN PATENT DOCUMENTS

JP    48-26596    8/1973

(Continued)

OTHER PUBLICATIONS

Don Gervasio, et al., "Multilayerd Ceramic Reactor for the Steam Reofrming of Methanol Into Hydrogen Enriched Gas", Ceramic Transactions, vol. 127, 2002, pp. 157-166.

*Primary Examiner*—Cam N. Nguyen
(74) *Attorney, Agent, or Firm*—Oblon, Spivak, McClelland, Maier & Neustadt, P.C.

(57) ABSTRACT

There is disclosed a metal particle-dispersed composite oxide comprising a matrix material containing a composite oxide comprising a non-reducible metal oxide and an easily reducible metal oxide, the composite oxide containing 0.01 to 0.25 mol % of at least one additive metal selected from Al, Sc, Cr, B, Fe, Ga, In, Lu, Nb and Si, surface metal particles precipitated on an outer surface of the matrix material containing the composite oxide, and inner metal particles precipitated on an inner surface of the matrix material containing the composite oxide.

9 Claims, 4 Drawing Sheets

U.S. PATENT DOCUMENTS

| | | | |
|---|---|---|---|
| 4,882,130 A * | 11/1989 | Asai et al. | 422/310 |
| 5,318,757 A * | 6/1994 | Abe et al. | 422/174 |
| 5,494,881 A * | 2/1996 | Machida et al. | 502/439 |
| 5,579,534 A * | 11/1996 | Itoh et al. | 428/547 |
| 6,071,627 A * | 6/2000 | Yasuda et al. | 428/610 |
| 6,177,382 B1 * | 1/2001 | Hesse et al. | 502/439 |
| 6,194,083 B1 * | 2/2001 | Yasuda et al. | 428/615 |
| 6,277,489 B1 * | 8/2001 | Abbott et al. | 428/403 |
| 6,524,996 B1 * | 2/2003 | Bender et al. | 502/346 |
| 2004/0168367 A1 | 9/2004 | Suenaga et al. | |

FOREIGN PATENT DOCUMENTS

| | | |
|---|---|---|
| JP | 2000-469 | 1/2000 |
| JP | 2001-278656 | 10/2001 |
| JP | 2002-87801 | 3/2002 |
| JP | 2003-164761 | 6/2003 |
| JP | 2003164761 | 6/2003 |

* cited by examiner

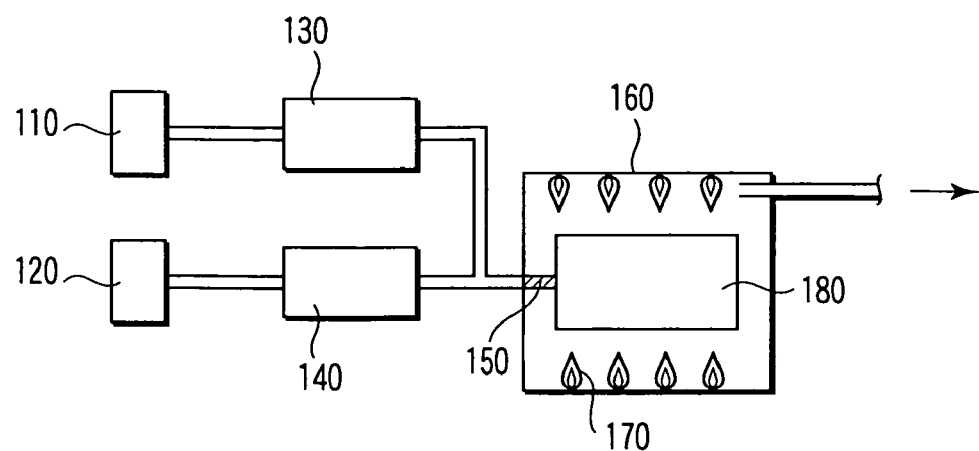
F I G. 7
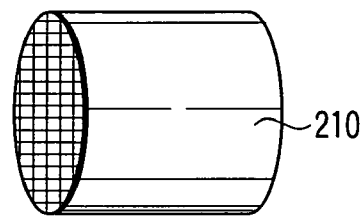
F I G. 8
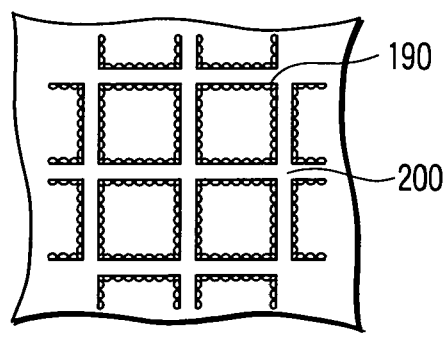
F I G. 9

METAL PARTICLE-DISPERSED COMPOSITE OXIDES, METAL PARTICLE-DISPERSED COMPOSITE OXIDE-SINTERED BODIES, METHOD OF MANUFACTURING METAL PARTICLE-DISPERSED COMPOSITE OXIDES, AND HYDROCARBON-BASED FUEL REFORMER

CROSS-REFERENCE TO RELATED APPLICATIONS

This application is based upon and claims the benefit of priority from the prior Japanese Patent Applications No. 2003-051357, filed Feb. 27, 2003; No. 2003-311493, filed Sep. 3, 2003; and No. 2003-342172, filed Sep. 30, 2003, the entire contents of all of which are incorporated herein by reference.

BACKGROUND OF THE INVENTION

1. Field of the Invention

The present invention relates to metal particle-dispersed composite oxides, metal particle-dispersed composite oxide-sintered bodies, a method of manufacturing metal particle-dispersed composite oxides, and hydrocarbon-based fuel reformers.

2. Description of the Related Art

In recent years, fuel cells are attracting much attention as being a clean and highly efficient power generating technique. As for the method of producing hydrogen gas employed as a fuel for the fuel cells, there is known a so-called "reforming" technique, wherein hydrogen gas is derived through a reaction between hydrocarbon-based fuel and water vapor, etc. by using catalysts or reforming materials. As for the reforming materials, there is generally employed a structure comprising an oxide ceramic carrier formed mainly of alumina, magnesia, silica, etc. and carrying on the surface thereof fine particles of a noble metal or fine particles of an active metal such as Cu, Ni, Co, etc. In order to enable the reforming materials to be successfully employed in a catalyst system (formed of a catalyst and a carrier) for this reforming, it is imperative for the reforming materials to have the characteristics that metal particles functioning as a catalyst are uniformly dispersed throughout the surface of a carrier carrying the catalyst, that metal particles are strongly bonded onto the carrier so that the catalyst particles are prevented from being desorbed during the reforming operation, and that the reforming materials are hardly deteriorated even in the usage thereof for a long time.

For example, although Cu-based catalysts which are employed as a catalyst for steam reforming of methanol are excellent in activity as well as in selectivity, the Cu-based catalysts are poor in stability and not suited for use in an operation taking a long time. On the other hand, noble metal-based catalysts are excellent in stability, but are expensive and the resources thereof are limited. Under the circumstances, catalysts comprising Ni or Fe are now being studied for use as a prospective material for a cheap and stable catalyst.

These metal particles employed as a catalyst are generally applied onto the surface of a carrier formed of ceramics, etc. by a co-precipitation method, etc. According to this method, fine particles comprising a catalyst element are precipitated on the surface of a catalyst carrier and then, reduced to obtain a catalyst system where catalyst particles formed of metal particles are dispersed the entire surface of the carrier. According to this method, the particle diameter of the catalytic metal can be made very small, in the order of nanometers. However, the co-precipitation method is accompanied with several problems, in that it is difficult to control the state of the dispersion of catalyst, thereby giving rise to the growth of metal particles in a heated environment, and that the bonding strength between the catalyst and the carrier is relatively poor, thereby desorbing the catalyst during the use thereof for the reforming. Furthermore, since porous pellets are employed as a carrier to be charged into a reactor, there is a problem that it will lead to an increase in pressure loss, thereby making it necessary to feed the hydrocarbon-based fuel to the reactor while applying a pressure to the fuel.

Meanwhile, in recent years, the technique for a small reactor having fine channels provided on a flat substrate with the aforementioned catalyst being positioned on and along these channels, wherein liquid hydrocarbon fuel such as methanol, ethanol, etc. is employed, is attracting much attention as being useful for a micro-reactor, etc. In this case also, the catalyst is generally applied onto the surface of a carrier by the co-precipitation method, etc. However, this technique is also accompanied with problems that, in addition to the problems mentioned above, it is difficult to uniformly precipitate the catalyst on the surface of the fine channels on the occasion of enabling the fine channels to carry the catalyst thereon, thereby flocculating the catalytic particles mainly at the corner portions of the sidewalls of the channels. As explained above, these conventional methods are still incapable of developing a fuel reformer having features which are fully satisfactory in terms of life and activity.

On the other hand, there is reported a method of preparing a material wherein a ceramic solid solution phase such as a Ni—Mg—O system or a Fe—Al—O system is subjected to a reducing treatment in a reduction atmosphere so as to precipitate metal particles such as Ni particles or Fe particles. Since metal particles in these materials are enabled to precipitate from the interior of ceramics through a solid-phase reaction thereof, the compatibility of the metal particles with the ceramic phase functioning a base phase is excellent and hence the metal particles are excellent in dispersibility. Further, since the metal particles precipitated in this manner are formed of a material of the same kinds as transition metals-based catalysts such as Ni-based catalyst, the metal particles are expected to be useful as a catalytic material. As a matter of fact however, since the materials manufactured in this manner are featured such that the metal particles are excessively precipitated in the interior of the ceramics, it has been considered difficult to utilize them as a catalyst.

If the metal particles are to be utilized as a catalyst, it is preferable that the metal particles exist only on a surface region of a composite oxide. Further, as far as the activity of catalyst is concerned, the number density of the metal particles (the number of catalytic particles per unit area) should preferably be as high as possible, and also the specific surface area of metal which is advantageous to the catalytic reaction should preferably be as large as possible. Therefore, if it is possible, in the aforementioned metal precipitation method utilizing a reduction treatment, to promote the precipitation of metal particles at the surface of a composite oxide while suppressing the precipitation of the metal particles at the interior of the composite oxide, the catalytic properties of the metal particles are expected to be further enhanced.

BRIEF SUMMARY OF THE INVENTION

According to one embodiment of the present invention, there is provided a metal particle-dispersed composite oxide comprising:

a matrix material containing a composite oxide comprising a non-reducible metal oxide and an easily reducible metal oxide, the composite oxide containing 0.01 to 0.25 mol % of at least one additive metal selected from Al, Sc, Cr, B, Fe, Ga, In, Lu, Nb and Si;

surface metal particles precipitated on an outer surface of the matrix material containing the composite oxide; and inner metal particles precipitated on an inner surface of the matrix material containing the composite oxide.

According to another embodiment of the present invention, there is also provided a metal particle-dispersed composite oxide-sintered body comprising:

a metal particle-dispersed composite oxide existing in a region of the sintered body extended from the surface thereof to a depth of 10 μm, the metal particle-dispersed composite oxide including a matrix material containing a composite oxide comprising a non-reducible metal oxide and an easily reducible metal oxide, the composite oxide containing 0.01 to 0.25 mol % of at least one additive metal selected from Al, Sc, Cr, B, Fe, Ga, In, Lu, Nb and Si;

surface metal particles precipitated on an outer surface of the matrix material containing the composite oxide; and inner metal particles precipitated on an inner surface of the matrix material containing the composite oxide.

According to a further aspect of the present invention, there is also provided a method of manufacturing a method of manufacturing a metal particle-dispersed composite oxide comprising:

mixing a powder of a non-reducible metal oxide, a powder of an easily reducible metal oxide and a powder containing at least one additive metal selected from Al, Sc, Cr, B, Fe, Ga, In, Lu, Nb and Si to obtain a mixed powder containing the additive metal at a ratio of 0.01 to 0.25 mol %;

molding the mixed powder into a molded body;

sintering the molded body to obtain a sintered body formed of a composite oxide comprising the non-reducible metal oxide and the easily reducible metal oxide; and subjecting the sintered body to a reducing treatment to precipitate particles of the easily reducible metal oxide on a surface of the composite oxide.

According to a further embodiment of the present invention, there is also provided a method of manufacturing a method of manufacturing a metal particle-dispersed composite oxide sintered body comprising:

preparing a couple of green sheets each containing a powder of a non-reducible metal oxide, a powder of an easily reducible metal oxide and an organic binder;

preparing a carbon slurry containing carbon, an easily reducible metal oxide and a binder;

coating the carbon slurry on one major surface of one of the green sheets to form a carbon slurry layer having a pattern of channel;

laminating the other one of the green sheets on the one of green sheets having the carbon slurry layer formed thereon and pressing these green sheets together to obtain an integrated green body;

eliminating the binder from the green body;

burning the carbon included in the carbon slurry layer to obtain a channel pattern;

sintering the green body having the channel pattern to obtain a sintered body; and subjecting the sintered body to heat treatment in a reducing gas atmosphere to reduce the easily reducible metal oxide to precipitate metal particles in a form of the channel pattern.

According to a further embodiment of the present invention, there is also provided a method of manufacturing a metal particle-dispersed composite oxide comprising:

preparing three green sheets each containing a non-reducible metal oxide, an easily reducible metal oxide and an organic binder;

forming a pattern of channel in one of the green sheet by punching;

interposing the green sheet having the channel pattern formed therein between the remaining couple of the green sheets and pressing these green sheets together to obtain an integrated green body;

cutting the integrated green body into a predetermined size to expose ends of the channel pattern;

eliminating the binder from the green body;

sintering the green body eliminated of the binder to obtain a sintered body; and subjecting the sintered body to heat treatment in a reducing gas atmosphere to reduce the reducible metal oxide to precipitate metal particles in a form of the channel pattern.

According to a further embodiment of the present invention, there is also provided a method of manufacturing a method of manufacturing a metal particle-dispersed composite oxide sintered body comprising:

preparing a couple of sheets each formed of a non-reducible metal oxide and having a first major surface and a second major surface;

forming a fluid passage groove on the first major surface of each of the sheets;

forming a layer of an easily reducible metal on a surface of the fluid passage groove;

laminating the couple of sheets each other with the first major surfaces of these sheets being contacted with each other to obtain a laminate;

subjecting the laminate to heat treatment to occur diffusion solid solution between the non-reducible metal oxide and the easily reducible metal to form a diffusion solid solution layer; and subjecting the heat-treated laminate to heat treatment in a reducing gas atmosphere to reduce the easily reducible metal included in the diffusion solid solution layer to precipitate particles of the easily reducible metal in the fluid passage groove.

According to a further embodiment of the present invention, there is also provided a hydrocarbon fuel reformer comprising:

a fuel tank accommodating a hydrocarbon fuel;

a reforming agent tank accommodating a reformer for reforming the hydrocarbon fuel;

a preliminary heater vaporizing the hydrocarbon fuel and the reforming agent;

a mixer mixing the vaporized hydrocarbon fuel and the vaporized reforming agent;

a reformer having a catalyst layer containing a reforming catalyst occurring a reaction in a mixed gas obtained from the mixer to reform the mixed gas into a fuel mainly comprising hydrogen gas, the reforming catalyst being formed of the metal particles-dispersed composite oxide; and a heater heating the reformer.

BRIEF DESCRIPTION OF THE SEVERAL VIEWS OF THE DRAWING

FIG. 7 is a diagram schematically illustrating a hydrocarbon-based fuel reformer according to one embodiment of the present invention;

FIG. 8 is a perspective view representing a metal particle-dispersed composite oxide of honeycomb structure; and FIG. 9 is a diagram schematically illustrating a sectional structure of a honeycomb-shaped metal particle-dispersed composite oxide.

DETAILED DESCRIPTION OF THE INVENTION

Figure 1A:
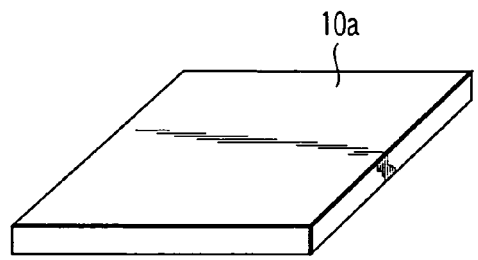
FIGS. 1A to 1D are perspective views each illustrating, stepwise, the process for manufacturing a metal particle-dispersed composite oxide according to one embodiment of the present invention.

Next, the embodiments of the present invention will be explained in detail.

The metal particle-dispersed composite oxide according to one embodiment of the present invention is formed of oxide particles constituted by a solid solution phase comprising a non-reducible metal oxide and an easily reducible metal oxide, wherein metal particles employed as a reducible oxide-constituting element are dispersed and precipitated on the surface as well as in the interior of the oxide particles. By the term "the surface of oxide particles", it is intended to include an interface between mono-oxide particles, the surface of oxide particles and a superficial region of oxide particles which ranges from the surface thereof to a depth of less than 200 nm. The reason for defining the terms in this manner is intended to include, within the scope of "surface", the metal particles which may precipitate along a crystal defect which is developed micromorphologically from the surface of oxide particles into the interior thereof. Further, by the term "the interior of oxide particles", it is intended to means the inner region of oxide particles located at a depth of 200 nm or more.

The expression of "metal particle-dispersed composite oxide" may be replaced by the expression of "metal particle-carrying composite oxide". Further, the metal particle-dispersed composite oxide that has been formed monolithically may be called a metal/oxide monolith.

By the term of "reducible metal oxide", it is intended to mean a metal oxide which can be reduced to a metal in a hydrogen gas atmosphere at a temperature ranging from room temperature to 1500° C. More specifically, examples of such a metal oxide include oxides of Cu, Co, Fe, Ni, Mn, Zn, Sn, Cd, Pd, Ag, Ru, Rh, Mo, W and In. In particular, oxides of Cu, Co, Fe, Ni, Mn, Zn, Sn and Cd can be reduced to metals under a hydrogen partial pressure of $P H_2O/P H_2 = 10^{-4}$ or less and at a temperature of 600° C. When these metal oxides are employed as a catalyst for the reforming of gas or the synthesis of gas, the employment of nickel oxide, cobalt oxide, iron oxide or copper oxide is more preferable as these metal oxides are high in catalytic efficiency. Among these metal oxides, nickel oxide is most preferable.

The aforementioned reducible metal oxides may be employed singly or in combination of two or more. The combined use of two or more kinds of these reducible oxides as a catalyst in particular is more preferable in enhancing the catalytic properties after the reduction thereof. In this case, it is desirable to employ, as one of the reducible metal oxide, that which is lower in melting point than the oxide of the matrix phase. This additional reducible metal oxide can act as a sintering assistant to promote the sintering of the metal oxide, thus enabling to obtain a skeleton excellent in mechanical strength. As for specific examples of such a reducible metal oxide that is capable of functioning as a sintering assistant, they include copper oxide and silver oxide.

In particular, in addition to the property of enhancing the sinterability, copper oxide is also effective in miniaturizing the particle diameter of metal particles to be precipitated through the reduction. This particle-miniaturizing effect can be rendered most prominent when the content of copper oxide is within the range of 0.1 mol % to 5 mol %. More preferably, the content of copper oxide should be within the range of 0.1 mol % to 1 mol %, most preferably within the range of 0.1 mol % to 0.5 mol %.

On the other hand, by the terms of "non-reducible metal oxide", it is intended to mean a metal oxide which cannot be reduced to a metal in a hydrogen gas atmosphere at a temperature ranging from room temperature to 1500° C. Specific examples of such a metal oxide include oxides of Al, Mg, Si, Zr, Ti, Hf and Ce. These non-reducible metal oxides may be employed singly or in combination of two or more. Among these non-reducible metal oxides, magnesium oxide, zirconium oxide and cerium oxide are preferable as these metal oxides are capable of forming a stable solid solution, magnesium oxide being most preferable in this respect.

Incidentally, the details of these oxides can be obtained by referring, for example, to the paper "Hydrogen Reduction of metal oxides and sulfides", Japan Institute of Metals, Vol. 13, page 277, 1974.

The composite oxides according to one embodiment of the present invention is constituted by a solid solution comprising the aforementioned reducible metal oxides and non-reducible metal oxides. Specific examples of such a solid solution include a total solid solution of metal oxide-metal oxide such as NiO—MgO, CoO—MgO, FeO—MgO and NiO—CoO—MgO. Alternatively, it is also possible to employ a solid solution system where the solid solution limit of the easily reducible metal oxide to the non-reducible metal oxide is 1 atom. % or more at the hydrogen reduction temperature such as $ZrO_2$—NiO, MgO—CuO and MgO—Cu—ZnO. Further, it is also possible to employ a solid solution of composite oxides constituted by reducible metal oxides and non-reducible metal oxides. Namely, there is no particular limitation regarding the kinds of solid solution.

It is also possible to solid-solubilize a different kind of reducible metal oxide into any of the aforementioned combination of oxides. In this case, it would be advantageous in the respect that the metal particles to be precipitated on the surface as well as in the interior of metal oxide particles can be also alloyed with the metal oxide.

In the metal particle-dispersed oxides according to one embodiment of the present invention, metal particles exists on the surface as well as in the interior of metal oxide particles formed of any one of the aforementioned solid solutions. These metal particles are precipitated from a metal oxide solid solution by hydrogen reduction. Namely, the metal particles according to one embodiment of the present invention can be obtained by the hydrogen gas reduction of metal oxides wherein the metallic components constituting the reducible metal oxides are enabled to precipitate on the surface as well as in the interior of the solid solution. The metal oxides that have been precipitated on the surface as well as in the interior of the solid solution are more excellent in adhesivity to the metal oxide particles and hence more strongly and stably carried by the metal oxide particles as compared with the metal particles that can be obtained through the precipitation thereof from substances other than the metal oxide particles such as co-precipitation. Namely, it is possible to improve the physical and chemical stabilities of the interfacial structure between the metal oxide particles functioning as a carrier and the metal particles functioning as a catalytic metal. Therefore, when the metal particle-dispersed oxide of one embodiment of the present invention is employed as a catalyst, the flocculation and growth of the metal particles can be suppressed, thereby making it possible to prolong the period of high catalytic efficiency.

As explained above, since the metal particles according to one embodiment of the present invention are derived through the reduction of reducible metal oxides, the composition thereof is determined depending on the composition of the reducible metal oxides. Therefore, as in the case of the aforementioned reducible metal oxides, the metal particles should preferably be constituted by a metal selected from the group consisting of Cu, Co, Fe, Ni, Zn, Sn, Cd, Pd, Hg, Ag, etc.

When these metal particle-dispersed composite oxides according to one embodiment of the present invention are employed as a catalyst for the reforming of gas or the synthesis of gas, the employment, as the metallic particle component, of Ni, Co, Fe, Pd and Cu is more preferable as these metals are capable of enhancing the catalytic efficiency. More specifically, any one of these metals should desirably be employed as a main component for creating the metal particles containing at least 50 atom. % of said any one of these metals. As for additive metals employed in this case other than the metals constituting the main component, it is possible to employ Sn, Ag, Zn, etc.

The inner metal particles existing in the interior of the oxide particles in the metal particle-dispersed composite oxide according to one embodiment of the present invention should preferably be controlled such that a volume fraction of the inner metal particles is limited to not more than 1%. If the volume fraction of the inner metal particles is higher than 1%, the metal particle-dispersed composite oxide may be badly affected by the thermal expansion of the metal particles, thus resulting in the deterioration of the mechanical strength of the metal particle-dispersed composite oxide. However, if the volume fraction of the inner metal particles is less than 0.01%, it may become difficult to sufficiently secure the effect thereof to prevent the cracking of the metal particle-dispersed composite oxide. Therefore, the volume fraction of the inner metal particles should preferably be not less than 0.01%.

The volume of the surface metal particles can be determined as follows. First of all, the weight ($W_1(g)$) of an arbitrary quantity of the metal particle-dispersed composite oxide is measured and then, subjected to acid washing to elute the surface metal particles. Thereafter, the weight of the resultant metal particle-dispersed composite oxide is measured again ($W_2(g)$). Then, a difference between these weights as measured is calculated to obtain the weight of the surface metal particles (($W_1-W_2$)=$W_S(g)$). Furthermore, by using the density ($\rho(m^3/g)$) of the metal particles, the volume ($V_1(m^3)$) of the surface metal particles is calculated.

On the other hand, after drying this acid-washed sample, the specific surface area ($S=m^2/g$) of the sample is measured by BET method utilizing nitrogen gas adsorption to determine the surface area ($S(m^2)$) of the sample having a weight of $W_2(g)$. As a result of these operations, it is possible to determine the volume per unit surface area of the sample ($A=V_1/S$).

The volume per unit surface area of the surface metal particles should preferably be confined within the range of 0.001 $cc/m^2$ to 0.1 $cc/m^2$. If the volume per unit surface area of the surface metal particles is less than 0.001 $cc/m^2$, the presence in volume of the surface metal particles would be insufficient, thus diminishing the catalytic effect of the surface metal particles. On the other hand, if the volume per unit surface area of the surface metal particles exceeds 0.1 $cc/m^2$, the flocculation and growth of particles among the surface metal particles may be promoted.

The volume fraction of the inner metal particles can be determined by the following method. First of all, the volume ($V_2$) of the metal particle-dispersed composite oxide is measured after finishing the acid washing of the surface metal particles by Archimedes' principle. Then, the volume of the inner metal particles ($V_3(m^3)$) is determined by the measurement of magnetization. The resultant value thus obtained is employed for calculating the volume ($V_0(m^3)$) of the metal particle-dispersed composite oxide, i.e. $V_0(m^3)=V_2-V_3(m^3)$. As a result, the volume fraction of the inner metal particles can be determined by the formula of: ($V_3/V_0$).

The average particle diameter of the metal particles existing on the surface of the oxide particles should preferably be confined within the range of 10 nm to 100 nm. When the average particle diameter of the metal particles is confined within this range, the metal particles can be most effectively dispersed the entire surface of the oxide particles. If the average particle diameter of the metal particles precipitated on the surface of the oxide particles is smaller than 10 nm, the quantity of metal particles on the surface of the oxide particles may become insufficient. On the other hand, if the average particle diameter of the metal particles is larger than 100 nm, the surface area of the surface metal particles may become insufficient. The number density of the metal particles on the surface of the oxide particles should preferably be confined within the range of $1\times10^{13}/m^2$ to $1\times10^{15}/m^2$. If the metal particles are controlled to satisfy the aforementioned conditions, the growth of particles on the occasion of using them as a catalyst can be effectively suppressed.

As for the method of measuring the number density of the metal particles on the surface of the oxide particles, although there is not any particular limitation, it is preferable to measure the number density in a unit area ranging from 100 nm×100 nm to 1 μm×1 μm when a surface photograph of the oxide particles is taken by an electron microscope.

Although there is no particular limitation with respect to the interval between metal particles, it is preferable that, in order to suppress the growth of particles, the interval is not smaller than one half of the diameter of the metal particles, more preferably not smaller than the diameter of the metal particles.

The volume fraction of the metal particles that have been precipitated on the surface and in the interior of the oxide particles can be determined by the following method. Namely, the magnetization of metal particles is measured to determine the volume fraction of the metal particles. In this case, the magnetization of entire composite material comprising the oxide particles and metal particles is measured. Based on the result of this measurement, the volume fraction of the entire metal particles precipitated in the interior as well as on the surface of the oxide particles is calculated. Then, by using an acid which is capable of selectively acid-washing only the metal particles, the composite material is entirely subjected to acid washing. As for the specific examples of acid to be employed herein, they include an aqueous solution of nitric acid, hydrochloric acid, sulfuric acid, etc. Subsequent to the acid washing, the magnetization of the composite material is measured again. In this manner, the volume fraction of the metal particles existing in the interior of the oxide particles can be calculated. Then, by subtracting the volume of the metal particles existing in the interior of the oxide particles from the volume of metal particles existing the entire composite material, the volume fraction of the metal particles precipitated on the surface of the oxide particles can be determined.

The metal particle-dispersed composite oxide described above can be manufactured by using the method according to one embodiment of the present invention.

This manufacturing method includes three steps, i.e. the preparation of raw powder and precursor, solid solution reaction and hydrogen reduction.

As a result of intensive studies on a composite oxide of complete solid solution system with respect to the relationship between the characteristics of the metal that has been precipitated by reduction and the reforming properties thereof, the present inventors have found out that if the composite oxide contains a predetermined quantity of specific metal element, the metal particles can be prominently precipitated on the occasion of the reduction thereof. As for the specific examples of the metal element which is capable of exhibiting such an effect, they include Al, Sc, Cr, B, Fe, Ga, In, Lu, Nb and Si. Among them, Al, Cr and Sc are more preferable in this respect. Preferably, these metals should be added to a raw material in the form of oxides, since the oxides thereof can be procured easily and added a raw material in a simple method of only mixing and sintering. Although it is preferable that these metals are incorporated in the form of an oxide, the present invention is not limited to this oxide form but may be incorporated in any other forms such as hydroxides or carbonate compounds. It is assumed that these metals enter, as a metallic cation, into a solid solution, thereby inducing the nucleation and nuclear growth during the precipitation of the metal particles.

The non-reducible metal oxide such as MgO powder should preferably be mixed with the easily reducible metal oxide such as NiO powder or CoO powder at a molar ratio, although not limited, of 2:1. By mixing the non-reducible metal oxide with the easily reducible metal oxide at a molar ratio of 2:1, the quantity of the precipitation of metal by hydrogen reduction can be suppressed to a suitable degree, thereby making it possible to suppress the coalescence among the metal particles and the growth of the particles. It is conceivable as a modification of these composite oxides to employ a ternary oxide such as a NiO—MgO—CuO system. When this ternary composite oxide sintered body is subjected to reduction, Ni and Cu precipitates to form particles of Ni—Cu alloy on the surface as well as in the interior of the composite oxide body.

On the other hand, the aforementioned metals should preferably be incorporated in a form of oxide such for example as $Sc_2O_3$. The content of these metal elements such as Sc should preferably be confined within the range of 0.01 mol % to 0.25 mol % based on the entire quantity of the mixed powder. If the content of these additive metals is less than 0.01 mol %, it would be impossible to enable the easily reducible metal particles to precipitate in a sufficient amount on the surface of the composite oxide. On the other hand, if the content of these additive metals exceeds 0.25 mol %, the compound thus incorporated per se remains at the grain boundaries of the solid solution to obstruct the sintering property of the composite oxide and hence the mechanical strength of the composite oxide would be deteriorated. Furthermore, the degree of precipitation to be generated by the reduction would become excessive, thus giving rise to the flocculation and coalescence of metal particles and hence deteriorating the catalytic performance of the metal particles.

Optimum quantities of metal particles to be incorporated may differ depending on the kind of metal particles to be precipitated as well as on the conditions of the reduction. In any way, if the temperature of reduction is too high or if the period of reduction is too long, the metal particles precipitated would grow excessively. In this case, the catalytic activity of the metal particles would be deteriorated. Therefore, it is desirable to perform the reduction treatment at optimal temperatures and conditions.

Further, the present inventors have found out that the diffusion of metal ion into the surface of the oxide particles as well as the generation and growth of nucleus can be promoted by using a carbonate hydroxide compound. Further, by using a carbonate hydroxide compound, the volume fraction of the inner metal particles can be confined within the range of 0.01% to 1%.

In a preliminary step, a phase of carbonate hydroxide compound is caused to generate in the non-reducible metal oxide. The formation of this carbonate hydroxide compound phase can be effected by reforming the surface of the non-reducible metal oxide powder in an atmosphere containing steam and carbon dioxide gas. With respect to the partial pressure of the atmosphere on this occasion, there is no particular limitation, so that it is only required that the ratio of the carbonate hydroxide compound phase in the non-reducible metal oxide powder is confined within the range of 5 wt. % to 20 wt. %. As long as the ratio of the carbonate hydroxide compound phase is confined within this range, the density of the precipitation of metal particles on the surface of the oxide particles can be enhanced. If the ratio of the carbonate hydroxide compound phase is less than 5 wt. %, it would be impossible to sufficiently derive the effects of the carbonate hydroxide compound. On the other hand, if the ratio of the carbonate hydroxide compound phase exceeds 20 wt. %, the sintering reaction may become insufficient, thus making it impossible to manufacture uniform ceramics. Thus, in order to efficiently obtain a desirable composite composition, the ratio of the carbonate hydroxide compound should preferably be confined within the range of 10 wt. % to 15 wt. %.

With respect to the composition of the carbonate hydroxide compound, there is not any particular limitation. Namely, it is only required that the compound concurrently includes carbonate group (CO) and hydroxide group (OH). Examples of such compounds include a compound containing a carbonate compound in the crystal phase of hydroxide, and a compound containing a hydroxide compound in the crystal phase of carbonate compound. Specific examples of the carbonate hydroxide compound include magnesium hydroxyl carbonate ($3MgCO_3Mg(OH)_2 3H_2O$).

The present inventors also found out that in a case where MgO is employed as a non-reducible metal oxide, it is more preferable to employ a raw material containing Al component at a ratio of 0.001 to 0.1 mol %. If the content of Al component is less than 0.001 mol %, it would be impossible to derive the effects of adding the Al component. On the other hand, if the content of Al component is larger than 0.1 mol %, the additives may precipitate exceeding over the range of solid solution. More preferably, the content of Al component should be confined within the range of 0.01 to 0.05 mol %. Although this Al component is capable of exhibiting higher effects as it is employed together with the carbonate hydroxide compound, it is also confirmed that even if this Al component is employed individually in the manufacture of the metal particle-dispersed composite oxide according to the embodiments of the present invention, it is possible to derive the effects of this Al component. It is also found out that when the metal particle-dispersed composite oxide containing this Al component at the aforementioned preferable ratios is employed as a catalyst, the activity of the metal dispersed therein as a catalyst can be enhanced.

The average particle diameter of the non-reducible metal oxide powder employed as a raw material for the treatment of hydrocarbon compounds should preferably be confined within the range of 10 nm to 100 nm. When the average particle diameter of the non-reducible metal oxide powder is confined within this range, the reaction can be more efficiently caused to take place. On the other hand, the average particle diameter of the reducible metal oxide powder should preferably be confined within the range of 100 nm to 10 μm. If the average particle diameter of the reducible metal oxide powder is larger than the upper limit of this range, it may become difficult to obtain a uniform mixture, thus giving rise to the generation of a non-uniform system in the distribution of the reducible metal oxide and the non-reducible metal oxide in the sintered body. As a result, the metal particles to be precipitated would become non-uniform, thus inviting the shortening of the catalytic life. On the other hand, if the average particle diameter of the reducible metal oxide powder is smaller than the lower limit of this range, it may become difficult to handle it, thus deteriorating the productivity.

In the preparation of mixed powder, a non-reducible metal oxide, a reducible metal oxide and a compound containing at least one additive metal selected from the group consisting of Al, Sc, Cr, B, Fe, Ga, In, Lu, Nb and Si are uniformly mixed together by a ball mill. On this occasion, in order to prevent the inclusion of foreign matters, it is preferable to employ a ball and a pot both being made of nylon and the like. The mixing method may be either a wet system or a dry system. However, in order to make the mixture more uniform, a wet type mixing is more preferable, wherein a binder such as PVA (polyvinyl alcohol) may be incorporated therein.

If powder having the aforementioned carbonate hydroxide compound phase formed therein is employed as a non-reducible metal oxide, the employment of ball mill mixing by dry system is preferable so as not to minimize the effects of the surface treatment. Upon finishing the mixing, an organic binder may be added to the mixed powder and then kneaded by using a kneader. There is no particular limitation with respect to the organic binder to be employed on this occasion and hence any conditions which are generally adopted in the extrusion-molding of an ordinary ceramic molded body may be optionally selected. Specifically, it is possible to employ PVA (polyvinyl alcohol) and ethyl cellulose for instance. As for the quantity of this organic binder also, there is not any particular limitation and hence the organic binder may be employed at a ratio ranging from 5 wt. % to 20 wt. %.

A kneaded product where an organic binder is intermingled therein may be molded as it is by using a mold. If a ceramic monolith such as a honeycomb type monolith is manufactured, the kneaded product is introduced into an extruder provided with a mouthpiece of suitable configuration and extruded through the mouthpiece to obtain a molded body. Although there is no particular limitation with regard to the speed of extrusion, it is desirable to select a suitable condition so as not to destroy the product at the time of extrusion.

After the molding, the molded body is introduced into a degrease furnace and degreased through heating, thus removing the organic binder. Although the conditions for this degreasing differ depending on the kinds of the organic binder, it is preferable that the temperature is raised slowly at a rate of 1° C./min. up to about 500° C. and then this temperature is maintained for several hours, after which the molded body is gradually cooled in the furnace without quenching it. By these steps, the precursor of the metal particle-dispersed oxide according to the embodiments of the present invention can be obtained.

Then, the precursor of the metal particle-dispersed composite oxide is introduced into an atmospheric furnace and thermally sintered to manufacture an oxide consisting of a solid solution. The sintering temperature should preferably be confined within the range of 1000° C. to 1400° C., more preferably 1100° C. to 1400° C. If the sintering temperature is lower than 1000° C., the sintering would become incomplete, thus rendering the mechanical strength of the sintered body insufficient. On the other hand, if the sintering temperature exceeds 1400° C., the decomposition and fusion of the reducible metal oxide employed as a raw material would occur. Although there is not any particular limitation with respect to the rate of increasing or decreasing the temperature, it is preferable, in order to prevent the fracture due to thermal strain, to perform the heating or cooling at a rate of 1-5° C./min.

When the reduction treatment of the sintered body consisting of solid solution is performed in a reducing gas atmosphere such as hydrogen gas, the metal particles precipitate on the surface as well as at the grain boundaries of the composite oxide. For example, in the case of NiO—MgO, part of the solid solution, i.e. Ni particles which are easily reducible precipitate. The Ni particles generated in this method are excellent in dispersibility and, since they are precipitated from the interior of the composite oxide employed as a matrix, the adhesion of the Ni particles to the matrix is very strong.

The composite oxide that has been molded into a configuration of monolith may be subjected to the reduction treatment as it is. For example, the composite oxide may be molded into a honeycomb structure and sintered, the resultant sintered body being subjected to the reduction treatment as it is, thereby manufacturing a monolith. The metal particle-dispersed composite oxide according to one embodiment of the present invention can be manufactured in this manner. The aforementioned metal particle-dispersed composite oxide exists on the surface region of the sintered body of the metal particle-dispersed composite oxide of the embodiment of the present invention. Although there is no particular definition with regard to the term, surface region, it is preferable that the scope thereof is limited to a region ranging from the surface to a depth of not more than 100 μm, more preferably not more than 10 μm. Because, when the term is applied to a sintered body, only the surface and the neighboring to the surface can be utilized as a catalyst, so that it is important that this surface region is constituted by the metal particle-dispersed composite oxide of the embodiment of the present invention for the purpose of securing a sufficient mechanical strength of the sintered body as a whole.

The metal particle-dispersed composite oxide according to the embodiments of the present invention may be formed as a surface layer of other ceramics. Examples of such ceramics include aluminum oxide, a composite oxide comprising aluminum and silicon, etc. The metal particle-dispersed composite oxide according to the embodiments of the present invention may be formed into slurry by a method wherein a mixed powder having a predetermined composition is mixed with ethanol or water and about 1% of a dispersing agent (ammonium polycarbonate-based agent), and the viscosity of the resultant mixture is suitably adjusted to obtain the slurry. The slurry thus obtained can be coated on the surface of other ceramics and dried, which is followed by sintering and reduction. A honeycomb formed of a dissimilar material (for example, cordierite: a composite oxide comprising alumina, silica and magnesia) may be dipped into the slurry to coat the honeycomb with the slurry.

In this case, the thickness of the coated layer should preferably be as thin as 10 to 100 μm. If this coated layer is relatively thick, the peeling or cracking thereof may be caused to occur. Preferably, the surface region should be entirely confined to not more than 10 μm. Because, the heat conduction of this region is caused to decrease as the metal particles are dispersed. If the heat conduction is deteriorated, the thermal response of the catalytic portion would be deteriorated, taking much time for heating and cooling the catalyst. Namely, the response of catalyst to exotherm and endtherm may be deteriorated.

On the other hand, if the metal particle-dispersed composite oxide is applied in a form of powder, the sintered body that has been subjected to a solid solution reaction is fractured, pulverized and classified into powder of suitable configuration.

In the case of monolith type sintered body, the Ni phase is enabled to precipitate in the surface region of the oxide particles including the region located at a depth of 10 μm from the surface of the solid solution. It is possible in this manner to disperse the metal particles into the surface of the oxide particles at a high density and uniformly. Moreover, since the metal is enabled to precipitate from the interior of the sintered body, the segregation thereof would be minimized, thus obtaining a sintered body excellent in dispersion of metal particles.

On the other hand, the Ni phase also precipitate in the interior of the oxide particles. However, in contrast to the conventional selective reduction method, the quantity of the Ni phase precipitated in the interior of the oxide particles can be suppressed to a very small degree in the embodiments of the present invention, so that the quantity of the Ni phase may be controlled in such a manner as to effectively prohibit the generation or propagation of cracking that may become a cause for the fracture of the sintered body. Further, the Al component existing in the non-reducible metal oxide also remains in the phase of the ceramics, thereby effectively contributing to the enhancement of performance of the catalyst.

Although there is not any particular limitation with regard to the conditions of reduction for effecting the precipitation of metal particles, it is preferable to select conditions which enable the metal particles to be preferentially precipitated on the surface of the metal oxide. Generally, it is possible to adopt a method wherein the temperature rise, the reduction and the cooling of the sintered body are performed after the partial pressure of hydrogen gas in a hydrogen furnace has been made constant. It is also possible to adopt another method other than the aforementioned method. More specifically, the interior of the hydrogen furnace is purged with an inert gas such as argon gas and then the temperature of the furnace is raised up to the reduction temperature and then, the reduction is performed while gradually increasing the partial pressure of hydrogen gas. In the case of the latter method, the reduction can be proceeded gradually from the surface of the sintered body, thereby making it possible to precipitate the metal particles preferentially on the surface of the sintered body. The latter method is also applicable to the case where two or more reducible metal oxides are employed. Even in the case where two or more reducible metal oxides each differing in reduction reaction initiating temperature are employed, any difference in precipitating time of metal oxides can be minimized thus making it possible to precipitate these different metal particles almost concurrently with each other, thereby making it possible to obtain uniform composite metal particles.

As described above, an average particle diameter of metal particles existing on the surface of the metal oxide should preferably be confined within the range of 10 nm to 100 nm, more preferably not larger than 50 nm. Further, the number density of metal particles existing on the surface of the metal oxide should preferably be confined within the range of $1\times10^{13}/m^2$ to $1\times10^{15}/m^2$.

The features of the metal particles to be precipitated can be controlled depending on the mixing ratio between the easily reducible metal oxide and the non-reducible metal oxide, on the partial pressure of hydrogen gas on the occasion of hydrogen reduction treatment and on the processing temperature on the occasion of hydrogen reduction treatment. Specifically, the lower the ratio of the easily reducible metal oxide is, the smaller the particle diameter of precipitated metal particles would become, resulting in an increase in number density. Further, the lower the partial pressure of hydrogen gas is or the lower the reduction treatment temperature is, the smaller the particle diameter of precipitated metal particles would become, resulting in the likelihood of increasing the number density. Therefore, by suitably selecting optimal reaction conditions in conformity with the reaction system, it would become possible to precipitate the metal particles on the surface and interior of the metal oxide particles while controlling the features of metal particles within the aforementioned limitation.

In particular, when the sintered body is employed as a catalyst for reforming methane, natural gas or town gas, the reduction reaction-initiating temperature should preferably be 800° C. or more. When the sintered body is sufficiently reduced at these high temperatures, it would become possible to prevent the reduction reaction from proceeding during the actual use thereof as a catalyst.

The metal particles precipitated on the surface of the metal oxide particles by the reduction treatment are very excellent in uniformity in contrast to the metal particles that having formed by the conventional method such as dipping method.

As described above, by going through the aforementioned manufacturing steps, the metal particle-dispersed composite oxide can be manufactured. Since this manufacturing process is simplified in this manner as compared with a wet type method such as a co-precipitation method, the method according to the aforementioned embodiment of the present invention is advantageous in saving manufacturing cost.

By the aforementioned steps, it is now possible to deposit catalytic metal uniformly and at a high density on the surface of metal oxides acting as a catalyst carrier and, moreover, it is possible to manufacture a metal particle-dispersed composite oxide which is improved in mechanical strength. Further, it is possible to manufacture an anisotropic porous composite body by using this material where a catalytic metal is dispersed uniformly and at a high density on the surface of metal oxides.

According to the embodiments of the present invention, it is possible to manufacture a catalyst member which is finer in density and more excellent in controllability of number density and which is simpler in structure and can be manufactured at lower costs as compared with the catalyst member where a catalyst is carried on the inner walls of a porous body by a process such as a co-precipitation method. Moreover, the metal particle-dispersed composite oxide obtained by the method of the embodiment of the present invention are uniform in the distribution of metal particles without any possibility of generating segregation of metal particles. Therefore, it is possible to prevent the generation of non-uniformity in deposition of the particles at the corner portions of the oxides which has been found in the case of the conventional method, thereby making it possible to effectively utilize the catalyst.

Furthermore, since the greater part of the catalytic particles is enabled to contact the surface of the channel by linear contact or surface contact. Whereas, the metal particles employed as a catalyst in the conventional method are contacted with the walls of porous body by points, so that it has been unavoidable to generate the flocculation and growth with time of particles. It is possible, according to the embodiments of the present invention, to prevent the flocculation or growth with time of metal particles. Moreover, since fine metal particles are suitably distributed even into the interior of the oxide particles functioning as a catalyst carrier, there is little possibility that the carrier is caused to crack, thus making it possible to suppress the deterioration with time of the catalytic performance.

By way the aforementioned steps, it is possible to obtain the metal particle-dispersed composite oxides of the embodiments of the present invention.

Next, a method of manufacturing a sheet-like metal particle-dispersed composite oxide representing one embodiment of the metal particle-dispersed composite oxides will be explained.

FIGS. 1A to 1D are perspective views each illustrating, in stepwise, the process for manufacturing a metal particle-dispersed composite oxide according to one embodiment of the present invention.

First of all, a couple of green sheets as shown in FIG. 1A are prepared. In the manufacture of these green sheets, a reducible metal oxide and a non-reducible metal oxide are homogeneously mixed together by an epicyclic ball mill to obtain a mixed powder. The content of the non-reducible metal oxide in this mixed powder should preferably be 60 mol % or more. When the content of the non-reducible metal oxide is limited in this manner, it is possible to secure the mechanical strength of the sintered body after the sintering and hydrogen reduction and to employ the sintered body in an environment of high temperatures. More preferably, the content of the non-reducible metal oxide should be 70 mol % or more, most preferably 80 mol % or more. To this mixed powder thus obtained, the aforementioned organic binder can be added at a ratio ranging from 5 wt. % to 20 wt. %.

If required, a plasticizer, a dispersing agent, an organic solvent, etc. may be added to the aforementioned mixed powder. As for specific examples of the plasticizer, they include dibutyl phthalate (DBP), dioctyl phthalate (DOP), butylbenzyl phthalate, etc. As for specific examples of the dispersing agent, they include anionic surfactant, weak cationic surfactant, etc. As for specific examples of the organic solvent, they include acetone, isopropyl alcohol, etc.

By mixing and kneading these components, a raw material for the green sheet can be obtained. The raw material is then subjected to defoaming, which is followed by a step of forming it into a casting sheet having predetermined dimensions by using a doctor blade apparatus. The dimensions of this sheet can be suitably selected depending on the dimension of a laminator, etc. For example, the size of the sheet may be 5-100 cm in length, 5-100 cm in width and 0.03-1 mm in thickness.

The casting sheet is then dried at a temperature ranging from 40° C. to 120° C. by using a drying oven, thus obtaining a green sheet 10a as shown in FIG. 1A.

In the manufacturing method according to this embodiment, a couple of these green sheets having dimensions which are large enough to secure a desirable dimension even after the sintering thereof are prepared.

Figure 1C:
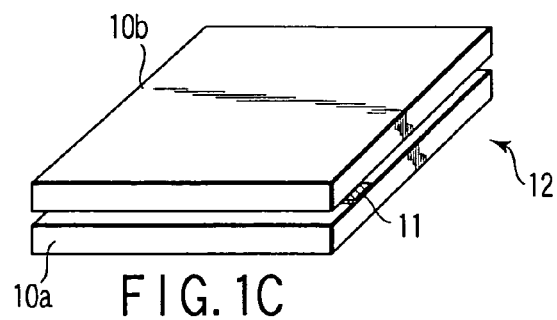
Figure 1B:
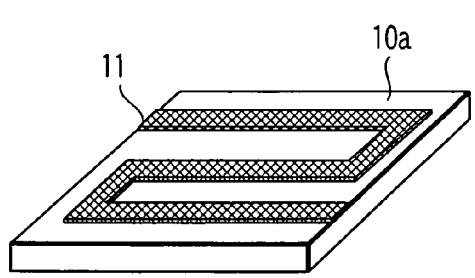

A carbon slurry layer 11 as shown in FIG. 1B is then formed on one of the green sheets.

The carbon slurry employed in this case can be prepared by dispersing carbon, a reducible metal oxide and a binder in an organic solvent. As for the carbon, it is possible to employ, for example, granular or fibrous carbon. As for the reducible metal oxide, it is possible to employ those which are already described above. As for the binder, it is possible to employ polyvinyl butyral (PVB), etc. In this case, the content of carbon may range from 30 to 70 wt. %, the content of reducible metal oxides may range from 30 to 70 wt. %, and the content of binder may range from 30 to 70 wt. %.

As required, an organic solvent (such as acetone and turpentine oil) may be included in the slurry in the preparation of the carbon slurry. However, in order to maintain a suitable degree of viscosity, the content of the organic solvent should be limited to not more than 30 wt. %.

The carbon slurry thus obtained is then coated on the surface of one of the aforementioned green sheets and dried by using a drying oven, etc. at a temperature ranging from about 40° C. to 120° C., thus forming a carbon slurry layer having a predetermined pattern of channel.

As shown in FIG. 1C, the other green sheet 10b is press-bonded onto the surface of aforementioned green sheet 10a having the carbon slurry layer formed thereon to form an integrated green body 12. This press-bonding and integration can be performed by using a press having a built-in heater.

The green body 12 is then placed in a degreasing furnace and heated at a rate of 1-5° C./min. up to a temperature ranging from 200° C. to 300° C. After being maintained at this range of temperature, the green body 12 is again heated up to a temperature ranging from 300° C. to 600° C. Thereafter, the green body 12 is maintained at this temperature for 1 to 24 hours to perform the degreasing.

Then, the green body 12 is heated up to a temperature ranging from 800° C. to 1000° C. at a rate of 1-5° C./min. and the green body 12 is maintained at this range of high temperature so as to burn out the carbon in the carbon slurry layer to form a channel.

Finally, the green body 12 is heated up to a temperature ranging from 1100° C. to 1500° C. at a rate of 1-15° C./min. and the green body 12 is maintained at this range of high temperature for 1 to 5 hours to manufacture a sintered body.

The sintered body thus obtained is introduced into an electric furnace to perform the reduction treatment thereof, thereby precipitating the reducible metal particles on the surface of the channel, thus forming a reforming catalytic layer. For example, when NiO is employed as a reducible metal oxide and MgO is employed as a non-reducible metal oxide, the NiO is reduced so that Ni particles precipitate on the surface of the channel pattern. In this manner, the metal particles can be dispersed uniformly and at a high density. Further, since the metal diffuse from the interior of the sintered body and to precipitate, it is possible to obtain a suitably dispersed state with minimal segregation. Namely, as compared with the case where metal particles are sedimented from outside by co-precipitation method or dipping method, the method of the embodiment of the present invention makes it possible to obtain metal particles which are excellent in adhesion. As a result, the metal particles can be closely and stably carried by the sintered body, thus providing an interfacial structure which is physically and chemically stable. Therefore, when the sintered body is employed as a catalyst, the flocculation and growth of metal particles can be suppressed, thus making it possible to prolong the period of high catalytic efficiency. The metal particles to be precipitated should preferably contain, as a main component, not less than 50 atom. % of at least one metal selected from the group consisting of Ni, Co, Fe, Pd and Cu. It is also possible to incorporate Sn, Ag, Zn, etc. as an additive metal. It is desirable that the green sheet and carbon slurry are prepared by suitably selecting a reducible metal oxide and in a manner to create the above-described composition.

As for the conditions for the reduction, although there is not any particular limitation, it is preferable to select conditions which enable only the surface of the channel pattern can be reduced.

For example, when the temperature rise, the reduction and the cooling of the sintered body are performed after the partial pressure of hydrogen gas in a hydrogen furnace has been made constant, the reducible metal particles can be precipitated on the surface of the channel pattern. More specifically, the interior of the furnace is purged with an inert gas such as argon gas and then further with hydrogen gas. Thereafter, the temperature of the sintered body was raised up to a temperature ranging from 700° C. 1000° C. at a rate of 1-15° C./min and the reduction thereof is performed for 10 to 120 minutes while maintaining the temperature of the sintered body at this range of high temperatures, thus enabling the reducible metal phase to precipitate on the channel pattern. Alternatively, after the interior of the hydrogen furnace is purged with an inert gas such as Ar gas, the sintered body is heated up to the reduction temperature and then, the reduction is performed while gradually increasing the partial pressure of hydrogen gas. In the case of the latter method, the reduction can be proceeded gradually from the sidewalls of the sintered body, thereby making it possible to precipitate the metal particles only on the surface of the sintered body. The latter method is also applicable to the case where two or more reducible metal oxides are employed. Even in the case where two or more reducible metal oxides each differing in reduction reaction initiating temperature are employed, any difference in precipitating time of metal oxides can be minimized thus making it possible to precipitate these different metal particles almost concurrently with each other, thereby making it possible to obtain uniform composite metal particles.

In particular, when the sintered body is employed as a catalyst for reforming methane, natural gas or town gas, the reduction reaction-initiating temperature should preferably be 800° C. or more. When the sintered body is sufficiently reduced at these high temperatures, it would become possible to prevent the reduction reaction from proceeding during the actual use thereof as a catalyst.

Average particle diameter of metal particles to be precipitated should preferably be confined to not larger than 500 nm, more preferably not larger than 100 nm, most preferably not larger than 50 nm. Further, the number density of metal particles to be precipitated should preferably be confined within the range of $1\times10^{12}/m^2$ to $1\times10^{15}/m^2$. When these conditions are satisfied, the growth of metal particles on the occasion of using the sintered body as a catalyst can be effectively suppressed.

Although there is no particular limitation with respect to the method of measuring the number density, it is preferable to measure the number density in a unit area ranging from 100 nm×100 nm to 1 μm×1 μm when a surface photograph of the oxide particles is taken by an electron microscope. Incidentally, the metal particles to be counted in determining the number density should be limited to only the metal particles that are directly contacted with the surface of the skeleton of the metal oxide. Because the particles deposited on other particles are assumed as giving rise to the growth of particles, this makes them incapable of functioning as an effective catalyst.

Although there is no particular limitation with respect to the interval between metal particles, it is preferable that, in order to suppress the growth of particles, the interval is not smaller than one half of the diameter of the metal particles, more preferably not smaller than the diameter of the metal particles.

The features of the metal particles to be precipitated differ depending on the mixing ratio between the easily reducible metal oxide and the non-reducible metal oxide, on the partial pressure of hydrogen gas on the occasion of hydrogen reduction treatment and on the processing temperature on the occasion of hydrogen reduction treatment. Specifically, the lower the ratio of the easily reducible metal oxide is, the smaller the particle diameter of precipitated metal particles would become, resulting in an increase in number density. Further, the lower the partial pressure of hydrogen gas is or the lower the reduction treatment temperature is, the smaller the particle diameter of precipitated metal particles would become, resulting in the likelihood of increasing the number density. Therefore, by suitably selecting optimal reaction conditions in conformity with the reaction system, it would become possible to precipitate the metal particles falling within the aforementioned limitation.

Incidentally, the number density of metal particles to be precipitated per unit hole volume of the channel should preferably be confined within the range of $1\times10^{15}/m^3$ to $1\times10^{19}/m^3$.

The quantity of metal particles per unit hole at the corner portion of the inner wall should preferably be confined to at most two times as large as the quantity of metal particles existing on the planar portion of the wall. The reason for this is to promote the utilization of the catalyst and to suppress the flocculation and growth of metal particles.

In order to obtain a catalyst which is excellent in catalytic efficiency, the quantity of metal particles existing at each corner portion of the inner wall should preferably be regulated by the density in relative to the space as defined below. Namely, if the quantity of catalyst ($m_1$g) existing in a predetermined space $X_1$(cc) at the corner portion of the wall is assumed as $x_1/m_1$(g/cc), and if the quantity of catalyst($m_2$g) existing in a predetermined space $X_2$(cc) (the same in volume as the space $X_1$) at the planar portion of the wall is assumed as $x_2/m_2$(g/cc), the quantity of the metal particles should desirably be confined to meet the following numerical formula.

$$(x_1/m_1)/(x_2/m_2) \leq 2$$

Figure 1D:
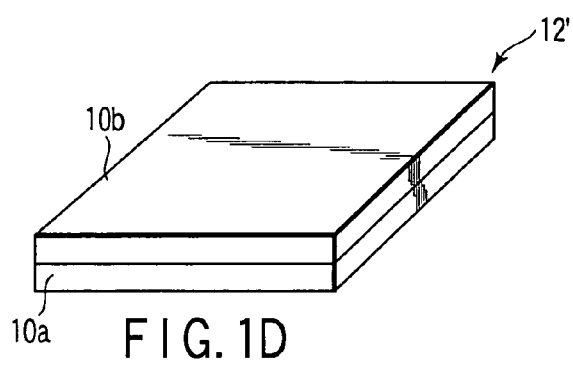

By going through the aforementioned steps, the metal particle-dispersed composite oxide 12' as shown in FIG. 1D can be accomplished. This metal particle-dispersed composite oxide may be defined as a metal/oxide monolith. The metal particle-dispersed composite oxide 12' thus obtained should preferably be stored in an Ar globe box, etc. without exposing it to air atmosphere.

Figure 2:
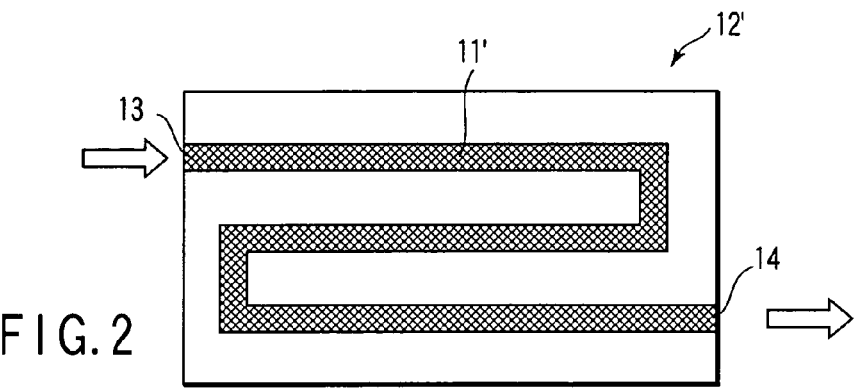
FIG. 2 is a plan view illustrating a metal particle-dispersed composite oxide according to one embodiment of the present invention.

In this metal particle-dispersed composite oxide 12', fuel is introduced from a fuel inlet port 13 of the channel 11' and discharged from a fuel outlet port 14 as shown in FIG. 2.

Figure 3:
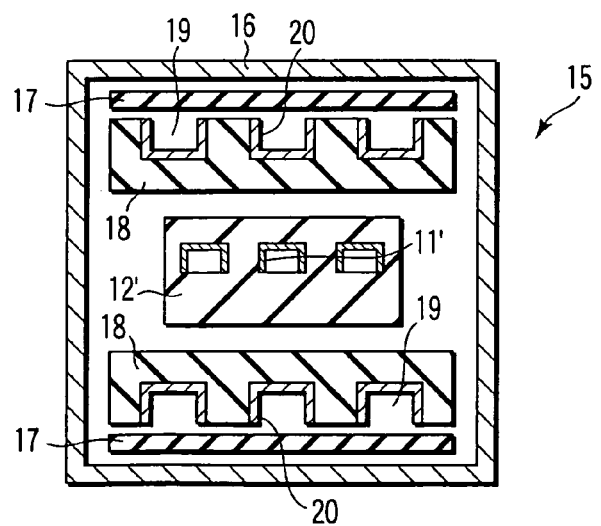
FIG. 3 is a cross-sectional view illustrating the structure of a fuel reforming member where a metal particle-dispersed composite oxide according to one embodiment of the present invention is employed.

FIG. 3 shows a cross-sectional view illustrating the structure of one example of the fuel reforming member where the metal particle-dispersed composite oxide 12' manufactured according to the method representing one embodiment of the present invention was employed. In this fuel reforming member 15, a couple of alumina sintered bodies 18 are disposed on the opposite inner walls of a stainless steel vessel 16 with a heat insulating plate 17 being interposed between the alumina sintered body 18 and the inner wall of the vessel 16. These alumina sintered bodies 18 are respectively provided with combustion fluid channels 19 each piecing through the alumina sintered body 18. These alumina sintered bodies 18 are also respectively provided, on the surface thereof, with a combustion catalytic layer 20 made of Pt. As the alumina sintered body 18 is constructed in this manner, gas and liquid are enabled to pass through the trenches 19 quite effectively, and at the same time, the sintered body itself is enabled to keep the high density and high mechanical strength thereof.

The metal particle-dispersed composite oxide 12' manufactured in this manner is disposed between a couple of the alumina sintered bodies 18.

As explained above, the metal particle-dispersed composite oxide 12' that can be manufactured by the method according to one embodiment of the present invention is capable of carrying fine metal particles functioning as a catalyst in a manner to enable the number density of the metal particles to be controlled excellently. Therefore, it is now possible to prevent the generation of non-uniformity of metal particles at the interior of the cells, in particular at the corner portions, thereby making it possible to effectively utilize the catalyst. Furthermore, since the greater part of the catalytic particles is enabled to contact the surface of the channel by linear contact or surface contact, it is possible to minimize the flocculation or growth with time of metal particles, thus suppressing the deterioration with time of the catalytic performance.

The metal particle-dispersed composite oxides that can be manufactured by the method according to the embodiments of the present invention can be suitably employed as a reforming catalyst for methanol and ethanol, as a reforming catalyst for methane, or as a catalyst for desulfurization. Furthermore, the metal particle-dispersed composite oxides proposed by the present invention are also applicable to the reforming of higher hydrocarbon liquid such as ethanol, kerosene, gasoline, etc. as well as to the reforming of higher hydrocarbon gas such as ethane, propane, etc.

FIGS. 4A to 4D are perspective views each illustrating, stepwise, the process for manufacturing a metal particle-dispersed composite oxide according to another embodiment of the present invention.

In this embodiment also, a green sheet containing an easily reducible metal oxide, a non-reducible metal oxide and an organic binder is employed in the same manner as described above. In this case however, three sheets each consisted of this green sheet having a larger size than a predetermined size are prepared.

Figure 4A:
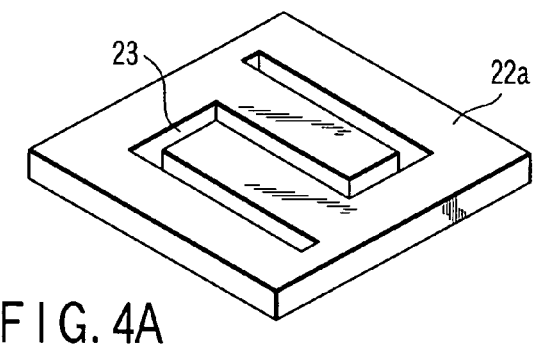
FIGS. 4A to 4D are perspective views each illustrating, in stepwise, the process for manufacturing a metal particle-dispersed composite oxide according to another embodiment of the present invention.
Figure 4B:
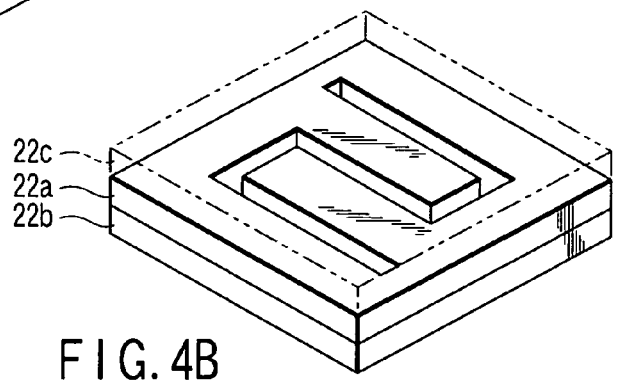

First of all, as shown in FIG. 4A, one of the green sheets 22a is worked so as to form a channel 23. The dimension of this channel 23 may be, for instance, 0.1-5 mm in width, 10-200 mm in total length and about 0.1-5 mm in thickness.

Figure 4C:
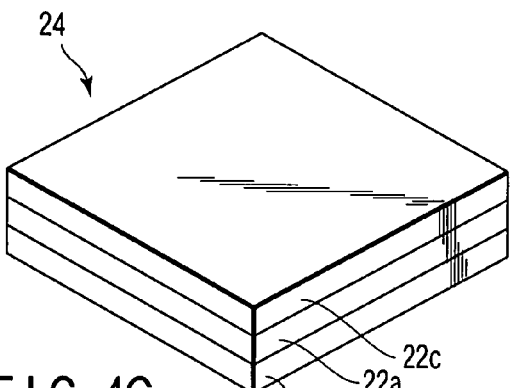

The green sheet 22a having this punched channel 23 is then sandwiched between a couple of green sheets 22b and 22c. The resultant laminate is pressed and integrated in the same manner as described above to manufacture a green body 24 as shown in FIG. 4C.

Figure 4D:
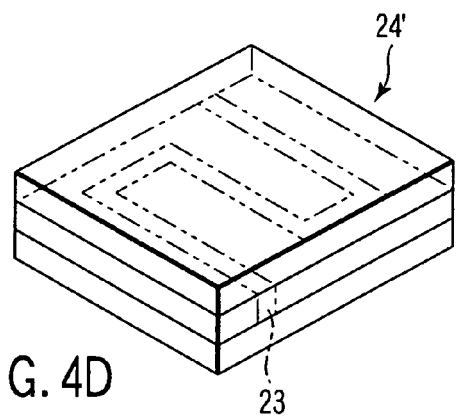

The green body 24 is then cut into a predetermined size to expose one end portion of the channel 23 as shown in FIG. 4D. Thereafter, the resultant green body is placed in a degreasing furnace to perform the degreasing thereof under the same conditions as described above, and then, subjected to sintering under the same conditions as described above. Finally, the sintered body is subjected to the reduction treatment thereof to precipitate the reducible metal particles on the surface of the channel 23, thereby accomplishing the metal particle-dispersed composite oxide 24'.

The metal particle-dispersed composite oxide thus obtained can be employed as a fuel reforming member constructed as shown in FIG. 3.

FIGS. 5A to 5D are cross-sectional views each illustrating, in stepwise, the process for manufacturing a metal particle-dispersed composite oxide according to a further embodiment of the present invention.

Figure 5A:
FIGS. 5A to 5D are cross-sectional views each illustrating, stepwise, the process for manufacturing a metal particle-dispersed composite oxide according to a further embodiment of the present invention.

First of all, as shown in FIG. 5A, a sheet formed of a non-reducible metal oxide is manufactured. As for the non-reducible metal oxide, it is possible to employ the same kinds of oxides as already explained above, and a couple of sheets having a predetermined size are prepared in advance in this embodiment.

Figure 5B:
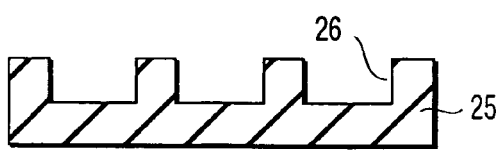
Figure 5C:
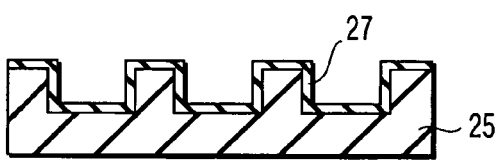
Figure 5D:
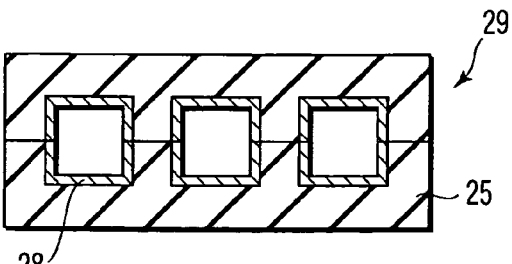

As shown in FIG. 5B, fluid channels 26 are formed on one of the surfaces (a first surface) of the non-reducible metal oxide sheets and then a reducible metal layer 27 is deposited thereon as shown in FIG. 5C. The dimension of these fluid channels 26 may be, for instance, 0.1-5 mm in width, 10-200 mm in total length and about 0.1-5 mm in thickness.

The reducible metal layer 27 may be formed of a single layer of such reducible metals as explained above or a laminate consisting of two or more layers of different kinds of these reducible metals, and can be deposited by sputtering. For example, a Cu layer having a thickness of 100 nm and a Ni layer having a thickness of 900 nm can be laminated so as to form a reducible metal layer 27.

Then, these sheets are laminated in such a manner that the surfaces thereof where the reducible metal layer 27 has been formed were contacted face to face, and the resultant laminate is then placed in an electric furnace. Subsequently, the temperature of the electric furnace was raised at a rate of 1-15° C./min. up to a temperature of 1100-1500° C. As a result, the non-reducible metal oxide and reducible metal diffuse and solid-solubilize to form a diffused solid solution layer on the surface of the fluid channel 26 and at the same time, these sheets are bonded to each other.

In this bonding step, an active metal solder such as Ti, Zr, etc. may be employed.

The sheets thus bonded are then subjected to reduction treatment under the conditions as already explained above to reduce the reducible metal and to precipitate metal particles 28 on the surface of the fluid channels 26, thus accomplishing a metal particle-dispersed composite oxide 29.

The metal particle-dispersed composite oxide thus obtained can be employed as a fuel reforming member constructed as shown in FIG. 3.

Figure 6A:
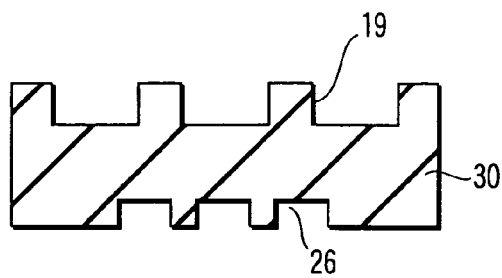
FIGS. 6A to 6C are cross-sectional views each illustrating, stepwise, the process for manufacturing a metal particle-dispersed composite oxide according to a further embodiment of the present invention.
Figure 6B:
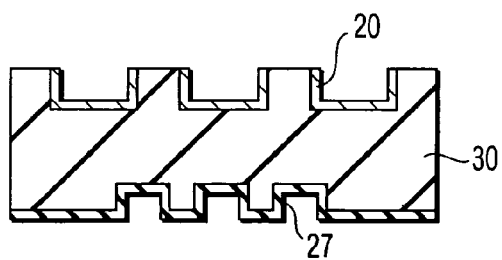
Figure 6C:
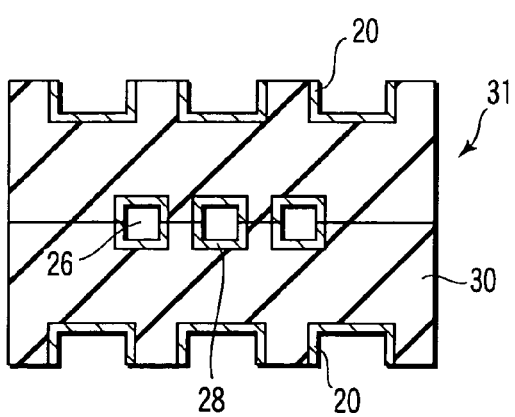

The manufacturing method shown in FIGS. 5A to 5D may be modified into the method as shown in FIGS. 6A to 6C. In this case, as shown in FIG. 6A, first of all, fluid channels 26 are formed on one of the surfaces (a first surface) of the non-reducible metal oxide sheets 30 and combustion fluid channels 19 are formed on the other surface (a second surface) thereof.

In the same manner as explained above, a reducible metal layer 27 is deposited inside the fluid channels 26 and a combustion catalyst layer 20 consisting of Pt, Pd, etc. is formed on the combustion fluid channels 19, thus obtaining a structure as shown in FIG. 6B.

Then, a couple of sheets each constructed as explained above are prepared and are laminated in such a manner that the surfaces thereof where the reducible metal layer 27 has been formed were contacted face to face, and the resultant laminate is then placed in an electric furnace and bonded together under the same conditions as explained above. Subsequently, the laminate is subjected to reduction treatment to precipitate the reducible metal on the surface of the fluid channels 26, thus accomplishing a metal particle-dispersed composite oxide 31 as shown in FIG. 6C.

Since this metal particle-dispersed composite oxide 31 is formed integral with the combustion fluid channels 19 having the combustion catalyst layer 20 deposited thereon, it is possible to obtain a fuel reforming member by simply placing the composite oxide 31 inside a predetermined vessel with a heat insulating plate being interposed therebetween. Furthermore, this composite oxide 31 is advantageous in the respect that the heat of the combustion catalyst portion can be efficiently transmitted to the reforming catalyst portion.

As explained above, according to these methods representing the embodiments of the present invention, since a catalyst layer is formed through the precipitation of easily reducible metal particles on the surface of fluid channel, it is now possible to manufacture a metal particle-dispersed composite oxide which is sufficiently long in life and high in activity at a low cost. The metal particle-dispersed composite oxide manufactured in this manner would be suited for use as a reforming catalyst of hydrocarbon-based fuel. The construction of a hydrocarbon-based fuel reformer according to one embodiment of the present invention is schematically shown in FIG. 7.

In this hydrocarbon-based fuel reformer shown in FIG. 7, a gaseous fuel such as $CH_4$ or a liquid fuel such as $CH_3OH$ and $C_2H_5OH$ is stored in a hydrocarbon-based fuel storage tank 110. On the other hand, water or carbon dioxide gas to be employed for reforming these fuels are stored in a reforming agent tank 120. These fuels and reforming agents vaporize at the pre-heating apparatuses 130 and 140, respectively and then introduced into a mixer 150. The mixed gas then react in a reforming catalyst layer 180, thereby reforming it into a fuel containing hydrogen gas as a main component.

On the occasion of using the reformed gas obtained in this manner as a fuel for a fuel cell, the reformed gas is once introduced into a carbon monoxide modifying apparatus (not shown), in which the concentration of CO in the reformed gas is decreased, thereby making it possible to feed the reformed gas to the fuel pole of a solid high-molecular membrane type fuel cell (not shown).

In the embodiment shown in FIG. 7, a burner 170 is employed for uniformly heating the interior of the reforming catalyst layer 180. However, it is also possible to employ combustion heating where a catalyst is utilized.

The reforming catalyst layer 180 may be charged with a metal particle-dispersed composite oxide 210 which is formed into a honeycomb structure as shown in FIG. 8 for instance. According to the embodiments of the present invention, since metal particles 190 are precipitated through the reduction thereof from a composite oxide 200, it is possible to deposit the metal particles 190 on the inner walls of the honeycomb structure constituting a passageway for gas, etc as shown in FIG. 9. Furthermore, when the catalyst is formed into a honeycomb structure in this manner, the handling thereof would be facilitated, thereby making it possible to greatly minimize the pressure loss in the flow of fuel and reforming gas.

Next, various embodiments of the present invention will be explained in detail with reference to the following specific embodiments, which, however, are not intended to limit the present invention.

Following are examples and comparative examples for explaining the present invention in detail.

EXAMPLES 1-2 AND COMPARATIVE EXAMPLES 1-3

NiO powder (average particle diameter: about 1 μm) as an easily reducible metal oxide, and MgO powder (average particle diameter: about 1 μm) as an easily reducible metal oxide were weighed so as to obtain a mixture containing NiO and MgO at a molar ratio of NiO:MgO=1:2. Then, high purity $Sc_2O_3$ was prepared as an additive compound and added to the mixture at a ratio of 0.015 mol % and 0.2 mol % both calculated as Sc element. The resultant mixture was homogeneously mixed by a wet method for 20 hours using nylon balls to obtain a mixed powder.

The mixed powder was press-molded at a pressure of 1 ton/cm$^2$ by using a mold press to obtain a molded body which was then sintered in air atmosphere at a temperature of 1,300° C. for 5 hours to manufacture a composite oxide sintered body. Then, the sintered body was heated to raise the temperature thereof at a rate of 15° C./min. under a 99.9% pure hydrogen gas flow at a flow rate of 500 cc/min. and at a temperature of 1,000° C., the sintered body was subjected to reducing treatment for 10 minutes, thereby precipitating Ni particles. During this reducing treatment, the sintered body was subjected to thermogravimetric analysis. The sample employed in measuring the reduction of weight was prepared by pulverizing the sintered body down to a particle size of several microns by using a mortar. Further, the texture of the microstructure of the sintered body was observed by using a scanning electron microscope (SEM), and the relative surface area of active metal was measured by hydrogen adsorption by using a chemisorption measuring apparatus.

The density, the decrease of weight and the relative surface area of active metal are summarized in the following Table 1 together with the composition of the composite oxides, the additive oxides and the quantity of the metal added thereto.

Further, three kinds of mixed powder were prepared by repeating the same procedures as described above except that the quantity of the $Sc_2O_3$ was altered to a ratio of 0 mol %, 0.008 mol % and 0.3 mol % both calculated as Sc element. Then, metal particle composite oxides of Comparative Examples 1-3 were manufactured in the same manner as described above except that these three kinds of mixed powder obtained as described above were employed. The properties of these metal particle composite oxides manufactured as described above were evaluated in the same manner as described above, the results being summarized in the following Table 1.

EXAMPLES 3-11

Nine kinds of mixed powder were prepared by repeating the same procedures as described above except that the additive compound was changed to $Al_2O_3$, $Cr_2O_3$, $In_2O_3$, $Lu_2O_3$, $Ga_2O_3$, $B_2O_3$, $Fe_2O_3$, $Nb_2O_3$ and $SiO_2$ and that the quantity of these compounds were changed to about 0.15 mol % calculated respectively as the metal elements of these compounds.

Then, metal particle composite oxides of Examples 3-11 were manufactured in the same manner as described above except that these mixed powder obtained as described above were employed. The properties of these metal particle composite oxides manufactured as described above were evaluated in the same manner as described above, the results being summarized in the following Table 1.

EXAMPLE 12 AND COMPARATIVE EXAMPLE 4

CuO powder (average particle diameter: about 1 μm) as an easily reducible metal oxide was additionally incorporated into the raw material of Example 1 and weighed so as to obtain a mixture having a composition of MgO:NiO:CuO=2:1:0.1 (molar ratio). Then, high purity $Sc_2O_3$ was prepared as an additive compound and added to the mixture at a ratio of 0.15 mol % calculated as Sc element.

Then, a metal particle composite oxide of Example 12 was manufactured in the same manner as described above except that this mixed powder obtained as described above was employed. In this metal particle-dispersed composite oxide, Ni—Cu alloy particles were precipitated on the surface of the composite oxide. Further, a metal particle-dispersed composite oxide of Comparative Example 4 was manufactured in the same manner as described above except that the additive compound was not incorporated at all.

The properties of this metal particle composite oxide manufactured as described above was evaluated in the same manner as described above, the results being summarized in the following Table 1.

EXAMPLE 13 AND COMPARATIVE EXAMPLE 5

A metal particle composite oxide of Example 13 was manufactured in the same manner as described above except that the easily reducible metal oxide was changed to CoO powder (average particle diameter: about 1 μm) and the $Sc_2O_3$ powder was added as an additive compound to the mixture at a ratio of 0.15 mol % calculated as Sc element. Further, a metal particle-dispersed composite oxide of Comparative Example 5 was manufactured in the same manner as described above except that the additive compound was not incorporated at all.

The properties of this metal particle composite oxide manufactured as described above was evaluated in the same manner as described above, the results being summarized in the following Table 1.

EXAMPLE 14

As a non-reducible metal oxide, high purity MgO powder (99.99%, average particle diameter: 50 nm) was heat-treated in an atmosphere containing steam and carbon dioxide at a temperature of 50° C. When the powder that had been heat-treated was analyzed by X-ray diffraction method, as large as 11 wt % of MgO carbonate hydroxide was observed. On the other hand, NiO powder (average particle diameter: about 1 μm) as an easily reducible metal oxide was prepared and weighed so as to obtain a mixture containing MgO and NiO at a molar ratio of MgO:NiO=2:1. Then, high purity $Al_2O_3$ powder was added to the raw mixture at a ratio of 0.15 mol % calculated as Al element. The resultant mixture was homogeneously mixed for 12 hours by a dry method using nylon balls to obtain a mixed powder.

The mixed powder was press-molded at a pressure of 1 ton/$cm^2$ by using a mold press to obtain a molded body which was then sintered in air atmosphere at a temperature of 1,300° C. for 5 hours to manufacture a composite oxide sintered body. Then, the sintered body was heated to raise the temperature thereof at a rate of 15° C./min. under a 99.9% pure hydrogen gas flow at a flow rate of 500 cc/min. and at a temperature of 1,000° C., the sintered body was subjected to reducing treatment for 10 minutes, thereby precipitating Ni particles. During this reducing treatment, the sintered body was subjected to thermogravimetric analysis. The sample employed in measuring the reduction of weight was prepared by pulverizing the sintered body down to a particle size of several microns by using a mortar. Further, the texture of the microstructure of the sintered body was observed by using a scanning electron microscope (SEM), and the relative surface area of active metal was measured by hydrogen adsorption by using a chemisorption measuring apparatus.

The density, the reduction of weight and the relative surface area of active metal are summarized in the following Table 1 together with the composition of the composite oxides, the additive oxides and the quantity of the metal added thereto.

TABLE 1

|  |  | Composition of composite oxide | Oxides added | Quantity of metal (mol %) | Density (g/$cm^3$) | Quantity decreased by reduction (1000° C. × 10 min.) | Specific area of active metals ($m^2$/g) |
|---|---|---|---|---|---|---|---|
| Comparative Examples | 1 | 2MgO—NiO-based | None | 0 | 3.75 | 0.8 | 0.2 |
|  | 2 | 2MgO—NiO-based | $Sc_2O_3$ | 0.008 | 3.74 | 0.8 | 0.2 |
|  | 3 | 2MgO—NiO-based | $Sc_2O_3$ | 0.30 | 3.68 | 13.5 | 1.5 |
|  | 4 | 2MgO—NiO—0.1CuO-based | None | 0 | 4.37 | 0.5 | 0.1 |
|  | 5 | 2MgO—CoO-based | None | 0 | 3.85 | 0.6 | 0.2 |
| Examples | 1 | 2MgO—NiO-based | $Sc_2O_3$ | 0.015 | 3.75 | 2.0 | 1.3 |
|  | 2 | 2MgO—NiO-based | $Sc_2O_3$ | 0.20 | 3.73 | 10.1 | 2.0 |
|  | 3 | 2MgO—NiO-based | $Al_2O_3$ | 0.15 | 3.70 | 6.3 | 1.6 |
|  | 4 | 2MgO—NiO-based | $Cr_2O_3$ | 0.15 | 2.94 | 8.3 | 1.8 |
|  | 5 | 2MgO—NiO-based | $In_2O_3$ | 0.15 | 4.34 | 1.5 | 0.7 |
|  | 6 | 2MgO—NiO-based | $Lu_2O_3$ | 0.15 | 3.69 | 1.4 | 0.7 |
|  | 7 | 2MgO—NiO-based | $Ga_2O_3$ | 0.15 | 3.75 | 1.3 | 0.6 |
|  | 8 | 2MgO—NiO-based | $B_2O_3$ | 0.15 | 4.17 | 1.0 | 0.4 |
|  | 9 | 2MgO—NiO-based | $Fe_2O_3$ | 0.15 | 4.11 | 1.0 | 0.5 |
|  | 10 | 2MgO—NiO-based | $Nb_2O_3$ | 0.15 | 3.70 | 1.0 | 0.6 |
|  | 11 | 2MgO—NiO-based | $SiO_2$ | 0.15 | 3.45 | 1.5 | 0.5 |
|  | 12 | 2MgO—NiO—0.1CuO-based | $Sc_2O_3$ | 0.15 | 4.37 | 5.2 | 1.7 |
|  | 13 | 2MgO—CoO-based | $Sc_2O_3$ | 0.15 | 3.72 | 9.5 | 1.9 |
|  | 14 | 2MgO—NiO-based | $Al_2O_3$ | 0.15 | 3.55 | 7.2 | 1.8 |

It will be recognized from the comparison between Example 1 and Comparative Example 1 that when an additive metal was included at a ratio of 0.015 mol %, it was possible to enhance the decrease of weight due to reduction and hence to increase the relative surface area of active metal. When the quantity of the additive metal was 0.20 mol %, the decrease of weight due to reduction was enhanced up to 10.1%, and the relative surface area of active metal was increased to ten times as large as that where the additive metal was not incorporated at all as seen from the results shown in Example 2.

On the other hand, as shown in Comparative Example 2, when the quantity of the additive metal was less than 0.01 mol %, the properties derived therefrom would be almost equivalent to that where the additive metal was not incorporated at all (Comparative Example 1), thus failing to exhibit any substantial effect. Furthermore, when the quantity of the additive metal exceeded 0.25 mol % (Comparative Example 3), it was recognized through the observation of the texture of the composite oxide that the coalescence and flocculation of precipitated particles became prominent, thus finding it not suitable for use as a catalyst. This tendency was found also applicable to other compounds containing other metal elements.

Further, as shown in the results of Examples 3-11, $Al_2O_3$, $Cr_2O_3$, $In_2O_3$, $Lu_2O_3$, $Ga_2O_3$, $B_2O_3$, $Fe_2O_3$ and $SiO_2$ were employed as the additive compound, it was possible to enhance the decrease of weight due to reduction and hence to increase the relative surface area of active metal.

Moreover, when the composition of the composite oxide was formed of MgO—NiO—CuO (Example 12) or MgO—CoO (Example 13), it was found possible to obtain more excellent properties as a catalyst.

As explained above, it was made clear that it was possible, by the addition of a very small quantity of metallic cation, to promote the precipitation of metal Ni particles (or Ni—Cu particles or Co particles) onto the surface of the composite oxides. As compared with the materials of Comparative Examples where these additive metals were not included therein, the metal particle-dispersed composite oxides according to one embodiment of the present invention were characterized by having a texture wherein the metal particles incorporated at a high number density (the number of metal particles precipitated per unit area) were uniformly distributed throughout the surface thereof without being flocculated or coalesced. Incidentally, the number density was fluctuated depending on the kinds of metal elements to be added. Generally speaking, as the quantity of metal element to be incorporated was increased, there was recognized the tendency that the number density was caused to decrease correspondingly. The reason for this can be attributed to the fact that most of the oxide incorporated remain at the grain boundaries to obstruct the sintering of the composite oxide. In order to prevent the deterioration of mechanical properties of the composite oxide, the quantity of metal element to be incorporated should be controlled to not more than 0.25 mol % at most.

In Example 14, MgO whose surface was undergone a carbonate hydroxide treatment was employed as a starting material. As compared with Example 3 where the same quantity of Al was incorporated therein, the particle diameter of MgO—NiO sintered body forming the texture thereof was relatively large, i.e. in the range of about 1 to 10 μm. However, the precipitation of Ni particles was more accelerated as compared with a sample where only Al component was incorporated. Namely, it has been made clear that when a compound containing metallic cation as proposed by the embodiment of the present invention is employed together with MgO powder that has undergone a carbonate hydroxide treatment, the precipitation of metal particles can be further accelerated.

EXAMPLE 15

As a non-reducible metal oxide, MgO powder (average particle diameter: 50 nm) was heat-treated in an atmosphere containing steam and carbon dioxide at a temperature of 50° C. When the powder that had been heat-treated was analyzed by X-ray diffraction method, as large as 11 wt % of MgO carbonate hydroxide was observed. Further, this MgO powder contained 0.04 mol % of Al and 0.02 mol % of Fe.

On the other hand, NiO powder (average particle diameter: about 1 μm) as an easily reducible metal oxide was prepared and weighed so as to obtain a mixture containing MgO and NiO at a molar ratio of MgO:NiO=2:1. Then, the resultant raw powder was homogeneously mixed for 12 hours by a dry method by using an epicyclic ball mill using alumina balls to obtain a mixed powder.

To the resultant mixed powder was added an ethyl cellulose-based binder and the resultant mixture was kneaded and molded into a molded body having a diameter of 15 mm and a height of 10 mm.

Then, this molded body was placed in a degrease furnace and heated up to a temperature of 350° C. over five hours and the degreasing of this molded body was performed at a temperature of 350° C. for one hour. After this degrease treatment, the molded body was transferred to an air furnace and heated up to a temperature of 1,300° C. over 10 hours and then sintered at a temperature of 1,300° C. for 5 hours to obtain a sintered body. Then, the sintered body thus obtained was pulverized and classified by using a sieve of 325-mesh. The classified powder was then introduced into a reduction furnace and the interior of the furnace was purged with argon gas and then with hydrogen gas at a flow rate of 100 mL/min. Then, the temperature of the classified powder was raised up to a temperature of 1,000° C. at a rate of 10° C./min. The classified sintered powder was then subjected to a reduction treatment for 10 minutes at a temperature of 1,000° C. to manufacture a metal particle-dispersed composite oxide. When the material of this composite oxide was analyzed, the existence of Al at a ratio of 0.13 mol % was recognized.

The texture of this metal particle-dispersed composite oxide manufactured as described above was observed by using an FE-SEM. As a result, it was confirmed that Ni fine particles having an average particle diameter ranging from 50 nm to 100 nm were precipitated on the surface of each single particle of metal oxide (ceramics) consisting of MgO—NiO and having a particle diameter ranging from 1 to 5 μm.

1 g of the ceramics particles was weighed and acid-washed with an aqueous solution of nitric acid so as to elute the Ni particles deposited on the surface of the ceramics particles. The resultant ceramics particles were then acid-washed, followed by water-washing and drying. As a result, the weight of ceramics particles thus dried was found decreased by 4.5 wt %. When the weight of the surface metal particles was calculated on the basis of the dry weight of ceramics particles, the weight thereof was found 45 mg. Further, by using the density (8.9 g/cc) of Ni, the volume of the surface metal particles was measured to find it as having 0.0051 cc. The specific surface area of the powder after the acid-washing was measured by BET method, finding it 0.45 m$^2$/g. As a result, the space occupied by the surface metal particles per unit surface area was 0.0113 cc/m$^2$.

Furthermore, the volume of the oxide particles after the acid washing was measured by using a densimeter, finding it as having 0.23 cc. On the other hand, the oxide particles after the acid washing was subjected to magnetization measurement, the magnetization corresponding to $3 \times 10^{-4}$ cc of nickel particles was recognized. When the volume fraction of the inner metal particles was measured on the basis of these results, the volume fraction was found 0.0013.

Subsequently, by using the aforementioned mixed powder, a honeycomb sintered body was manufactured according to the following method. First of all, an ethyl cellulose-based binder was added to the mixed powder and kneaded. Then, by using an extruder, the resultant mixture was allowed to pass through a honeycomb mouthpiece 1 mm in the length of one side of unit cell and 0.5 mm in wall thickness to manufacture a molded body. The molded body was then introduced into a degrease furnace and heated up to a temperature of 350° C. over five hours and the degreasing of this molded body was performed at a temperature of 350° C. for one hour. After this degrease treatment, the molded body was transferred to an air furnace and heated up to a temperature of 1,300° C. over 10 hours and then sintered at a temperature of 1,300° C. for 5 hours to obtain a honeycomb sintered body.

The dimension of the honeycomb sintered body thus obtained was exactly the same as designed, i.e. 1 mm in the length of one side of unit cell and 0.5 mm in wall thickness.

This honeycomb sintered body was then introduced into an experimental apparatus for the modification of methane and the interior of the apparatus was purged with argon gas. Thereafter, the interior of the apparatus was purged again with hydrogen gas at a flow rate of 100 mL/min. Then, the temperature of the sintered body was raised up to a temperature of 1,000° C. at a rate of 10° C./min. The sintered body was subjected to a reduction treatment for 5 minutes at a temperature of 1,000° C. to manufacture a molded body of the metal particle-dispersed composite oxide.

After finishing the manufacture of the molded body, the temperature was lowered down to 750° C. and the supply of hydrogen gas was stopped. Then, a reforming reaction was performed by passing methane gas and carbon dioxide gas through the molded body at a flow rate of 50 mL/min. This reforming reaction was continued for 5 hours and a difference in concentration of residual methane before and after the reaction was measured to determine the efficiency of the reforming.

The lower the concentration of residual methane after the reforming is, the higher the reforming efficiency is. Further, the smaller the variation between before and after the reaction is, the smaller the deterioration with time is. Further, the average particle diameter of the metal particles before and after the reforming was investigated through the observation of the texture of the oxide particles, the results obtained in this manner being summarized in the following Table 2. Incidentally, the fracture of the ceramic carrier after the reforming was not recognized.

EXAMPLE 16

A sintered body was manufactured under the same conditions as described above Example 15 except that CuO powder (average particle diameter: about 1 μm) was additionally employed as a raw powder so as to prepare a mixed powder having a composition of: MgO:NiO:CuO=2:1:0.1 (molar ratio). Then, the sintered body thus obtained was pulverized and classified by using a sieve of 325 mesh. The classified powder was then introduced into a reduction furnace and the interior of the furnace was purged with argon gas and then with hydrogen gas at a flow rate of 100 mL/min. Then, the temperature of the classified sintered powder was raised-up to a temperature of 1,000° C. at a rate of 10° C./min. The classified sintered powder was then subjected to a reduction treatment for 5 minutes at a temperature of 1,000° C. to manufacture a metal particle-dispersed oxide (composite material). This composite oxide contained Al at a ratio of 0.14 mol %.

The texture of this metal particle-dispersed composite oxide manufactured as described above was observed by using an FE-SEM. As a result, it was confirmed that Ni—Cu fine particles having an average particle diameter ranging from 10 nm to 50 nm were precipitated on the surface of each single particle of metal oxide (ceramics) consisting of MgO—NiO—CuO and having a particle diameter ranging from 1 to 10 μm.

1 g of the metal particle-dispersed composite oxide particles was weighed and acid-washed with an aqueous solution of nitric acid so as to elute the Ni—Cu particles deposited on the surface of the ceramics particles. The resultant particles were then acid-washed, followed by water-washing and drying. As a result, the weight of the particles thus dried was found decreased by 2.4 wt %. When the weight of the surface metal particles was calculated on the basis of the dry weight of particles, the weight thereof was found 24 mg. Further, when the concentration of Ni and Cu existing in the acid after the acid washing was analyzed, the existence of Cu at a 15 atom. % based on the quantity of Ni was recognized. Furthermore, by using the density (8.9 g/cc) of Ni—Cu, the volume of the surface metal particles was measured to find it as having 0.0027 cc. The specific surface area of the powder after the acid-washing was measured by BET method, finding it 0.30 $m^2/g$. As a result, the space occupied by the surface metal particles per unit surface area was 0.009 $cc/m^2$.

Further, the volume of the oxide particles after the acid washing was measured by using a densimeter, finding it as having 0.22 cc. On the other hand, the oxide particles after the acid washing was subjected to magnetization measurement, the magnetization corresponding to $1.5 \times 10^{-4}$ cc of Ni-15% Cu was recognized. When the volume fraction of the inner metal particles was measured on the basis of these results, the volume fraction was found 0.0007.

Subsequently, by using the aforementioned mixed powder, a honeycomb sintered body was manufactured according to the following method. First of all, an ethyl cellulose-based binder was added to the mixed powder and kneaded. Then, by using an extruder, the resultant mixture was allowed to pass through a honeycomb mouthpiece 1 mm in the length of one side of unit cell and 0.5 mm in wall thickness to manufacture a molded body. The molded body was then introduced into a degrease furnace and heated up to a temperature of 350° C. over five hours and the degreasing of this molded body was performed at a temperature of 350° C. for one hour. After this degrease treatment, the molded body was transferred to an air furnace and heated up to a temperature of 1,300° C. over 10 hours and then sintered at a temperature of 1,300° C. for 5 hours to obtain a honeycomb sintered body.

The dimension of the honeycomb sintered body thus obtained was exactly the same as designed, i.e. 1 mm in the length of one side of unit cell and 0.5 mm in wall thickness.

This honeycomb sintered body was then introduced into an experimental apparatus for the modification of methane and the interior of the apparatus was purged with argon gas. Thereafter, the interior of the apparatus was purged again with hydrogen gas at a flow rate of 100 mL/min. Then, the temperature of the sintered body was raised up to a temperature of 1,000° C. at a rate of 10° C./min. The sintered body was subjected to a reduction treatment for 5 minutes at a temperature of 1,000° C. to manufacture a molded body of the metal particle-dispersed composite oxide.

After finishing the manufacture of the molded body, the temperature was lowered down to 400° C. and the supply of hydrogen gas was stopped. Then, a reforming reaction was performed by passing methane gas and carbon dioxide gas through the molded body at a flow rate of 30 mL/min and 120 mL/min, respectively. This reforming reaction was continued for 5 hours and a difference in concentration of residual methane before and after the reaction was measured to determine the efficiency of the reforming.

The lower the concentration of residual methane after the reforming is, the higher the reforming efficiency is. Further, the smaller the variation between before and after the reaction is, the smaller the deterioration with time is. Further, the average particle diameter of the metal particles before and after the reforming was investigated through the observation of the texture of the oxide particles, the results obtained in this manner being summarized in the following Table 2. Incidentally, the fracture of the ceramic carrier after the reforming was not recognized.

EXAMPLE 17

MgO powder (average particle diameter: 100 nm) as a non-reducible metal oxide and NiO powder (average particle diameter: about 1 μm) as an easily reducible metal oxide were prepaclaimedred and weighed so as to obtain a mixture containing MgO and NiO at a molar ratio of MgO:NiO=1:2. Then, the resultant raw powder was homogeneously mixed for 12 hours by a dry method by using an epicyclic ball mill using alumina balls to obtain a mixed powder. Thereafter, a sintered body was manufactured under the same conditions as described in the aforementioned Example 15 except that this mixed powder was employed.

Then, the sintered body thus obtained was pulverized and employed to manufacture a metal particle-dispersed oxide (composite material) under the same conditions as described in Example 15. As a result of the analysis, this composite oxide was found containing Al at a ratio of 0.06 mol %. The texture of this metal particle-dispersed composite oxide manufactured as described above was observed by using an FE-SEM. As a result, it was confirmed that Ni fine particles having an average particle diameter ranging from 100 nm to 200 nm were precipitated on the surface of each single particle of metal oxide (ceramics) consisting of MgO—NiO and having a particle diameter ranging from 1 to 5 μm.

1 g of the composite oxide particles was weighed and acid-washed with an aqueous solution of nitric acid so as to elute the Ni particles deposited on the surface of the ceramics particles. The resultant composite oxide particles were then acid-washed, followed by water-washing and drying. As a result, the weight of composite oxide particles thus dried was found decreased by 8 wt %. When the weight of the surface metal particles was calculated on the basis of the dry weight of composite oxide particles, the weight thereof was found 80 mg. Further, by using the density of Ni, the volume of the surface metal particles was measured to find it as having 0.0009 cc. The specific surface area of the powder after the acid-washing was measured by BET method, finding it 0.5 $m^2/g$. As a result, the space occupied by the surface metal particles per unit surface area was 0.018 $cc/m^2$.

Further, the volume of the oxide particles after the acid washing was measured by using a densimeter, finding it as having 0.24 cc. On the other hand, the oxide particles after the acid washing was subjected to magnetization measurement, the magnetization corresponding to $2\times10^{-4}$ cc of Ni was recognized. When the volume fraction of the inner metal particles was measured on the basis of these results, the volume fraction was found 0.00083.

The results other than those described above are shown in the following Table 2.

In the example also, it was possible to derive the effects of promoting the diffusion of Ni ion/nucleation/growth of nucleus even though a carbonate hydroxide compound was not employed. The reason for this may be attributed to the fact that Al functioned to promote the diffusion and the nucleation/growth of nucleus.

COMPARATIVE EXAMPLE 6

A magnesia honeycomb having the same configuration as that of Example 15 was manufactured and immersed into a solution of nickel nitrate. Thereafter, the magnesia honeycomb was pulled out of the nickel nitrate solution and immersed in ammonium carbonate. Thereafter, the magnesia honeycomb was pulled out of the ammonium carbonate and dried in a drying oven of 110° C. Then, the magnesia honeycomb was heated and subjected to a reducing treatment in hydrogen gas at a temperature of 400° C., thus manufacturing a composite material. In this composite material, Ni particles were dispersed over the skeleton consisting of magnesia.

When the texture of the composite material was observed by FE-SEM, the particle diameter of the Ni particles was 100 nm and the number density thereof was $5\times10^{12}/m^2$. Further, a flocculation of Ni particles was recognized at the intersections (corners) between the partition walls of the honeycomb. The number density of Ni particles per unit volume in a region within a distance of 0.5 μm from the intersection was not less than three times as large as that of the central portion of the partition walls.

Then, by using the honeycomb thus obtained, the reforming experiment was performed in the same manner as described in Example 1 to investigate changes with time of the concentration of residual methane and of the average particle diameter of the metal particles. The results obtained are summarized in the following Table 2. Incidentally, a large number of desorption of the Ni particles was recognized after the reforming, and at the same time, the cracking and falling of the magnesia carrier were also recognized.

The honeycomb prior to the reforming experiment was immersed in an aqueous solution of nitric acid to elute the surface Ni. When the magnetization of the oxide particles was measured after the acid washing thereof, the presence of Ni was not detected.

COMPARATIVE EXAMPLE 7

A composite material was manufactured by following the same procedures as described in Comparative Example 6 except that a solution containing nickel nitrate and copper nitrate was substituted for the solution of nickel nitrate employed in Comparative Example 6. In this composite material, Ni—Cu particles were dispersed over the skeleton consisting of magnesia. When the texture of the composite material was observed by FE-SEM, the particle diameter of the Ni—Cu particles was 100 nm and the number density thereof was $5\times10^{12}/m^2$. Further, a flocculation of Ni particles was recognized at the intersections (corners) between the partition walls of the honeycomb. The number density of Ni particles per unit volume in a region within a distance of 0.5 μm from the intersection was not less than three times as large as that of the central portion of the partition walls.

Then, by using the honeycomb thus obtained, the reforming experiment was performed in the same manner as described in Example 15 to investigate changes with time of the concentration of residual methane and of the average particle diameter of the metal particles. The results obtained are summarized in the following Table 2. Incidentally, the cracking and falling of the magnesia carrier were recognized after the reforming.

The honeycomb prior to the reforming experiment was immersed in an aqueous solution of nitric acid to elute the surface Ni. When the magnetization of the oxide particles was measured after the acid washing thereof, the presence of Ni was not detected.

1B. Then, the coated layer was allowed to dry at a temperature of 100° C. to form a carbon slurry layer 11.

The other one of the green sheets was then superimposed under pressure on the carbon slurry layer 11 to prepare a laminated green body.

Then, this green body was placed in a degrease furnace and heated at a rate of 1° C./min. up to a temperature of 250° C. and allowed to stand at this temperature for 2 hours. There-

TABLE 2

|  |  | Metal oxide skeleton | Elements | Metal particles Average diameter (nm) | | Concentration of residual methane or methanol after reaction | |
|---|---|---|---|---|---|---|---|
|  |  |  |  | Before reaction | After reaction | 30 min. later | 5 hrs. later (increment) |
| Examples | 15 | MgO—NiO | Ni | 55 | 55 | 6% | 7% (1%) |
|  | 16 | MgO—NiO—CuO | Ni—Cu | 30 | 30 | 6% | 6% (0%) |
|  | 17 | MgO—NiO | Ni | 100 | 100 | 6.5% | 7.5% (1%) |
| Comparative example | 6 | MgO | Ni | 100 | 150 | 7% | 10% (3%) |
|  | 7 | MgO | Ni—Cu | 100 | 150 | 7% | 10% (3%) |

As shown in Table 2, the metal particle-dispersed oxides according to the embodiments of the present invention exhibited a high reforming efficiency as they were employed as a catalyst, and the deterioration with time of these oxides was found minimal. This may be attributed to the facts that the metal oxides employed as a carrier were all formed of a solid solution comprising a reducible metal oxide and a non-reducible metal oxide, and that the metal particles were created by precipitation. In the embodiments of the present invention, the volume of metal particles that had been precipitated on the surface of the metal oxides was larger than the volume of the metal particles precipitated in the interior of the metal oxides, thereby making it possible to maintain excellent properties as a catalyst.

EXAMPLE 18

NiO powder (average particle diameter: 1 μm) and CuO powder (average particle diameter: 1 μm) both as an easily reducible metal oxide and MgO powder (average particle diameter: 0.05 μm) as a non-reducible metal oxide were prepared and weighed so as to obtain a mixture containing NiO, CuO and MgO at a molar ratio of NiO:CuO:MgO=1:0.1:2. Then, the resultant raw powder was homogeneously mixed by using an epicyclic ball mill to obtain a mixed powder. Thereafter, 5 wt. % of acrylic resin binder, DOP of plasticizer, a dispersing agent, acetone and isopropyl alcohol were added to the aforementioned mixed powder and the resultant mixture was kneaded to form a slurry, thus obtaining a raw material for a green sheet.

Upon finishing the defoaming, the raw material was cast into a sheet having a size of 30 cm×20 cm×5 mm by using a doctor blade apparatus. Thereafter, the sheet was dried at a temperature of 60° C. to prepare a green sheet. The green sheet thus obtained was punched to form two sheets each having a size of 3 cm×6 cm.

On the other hand, 30 wt. % of kitchen black constituted by granular carbon was intermingled with the aforementioned slurry to prepare a carbon slurry.

This carbon slurry was then coated on the surface of one of the green sheets in such a manner as to form a pattern of channel-like configuration having a width of 2 mm, a total length of 180 mm and a thickness of 2 mm as shown in FIG.

after, the temperature of the green body was again increased at a rate of 1° C./min. up to a temperature of 500° C. and allowed to stand at this temperature for one hour to accomplish the degreasing of this green body. After this degrease treatment, the green body was heated again at a rate of 1° C./min. up to a temperature of 800° C. and allowed to stand at this temperature for one hour to burn out the carbon to form a channel. Furthermore, this green body was heated at a rate of 1° C./min. up to a temperature of 1,300° C. and then maintained at this temperature of 1,300° C. for 5 hours to obtain a sintered body.

The sintered body thus prepared was then introduced into an electric furnace and the interior of the furnace was purged with argon gas and then with hydrogen gas at a flow rate of 100 mL/min. Then, the temperature of the sintered body was raised up to a temperature of 800° C. at a rate of 10° C./min. The sintered powder was then allowed to stand for 5 minutes at this temperature of 800° C. to perform the reduction treatment of the sintered body in a hydrogen gas atmosphere. As a result, a Ni—Cu phase precipitated along the channel to obtain a metal particle-dispersed composite oxide. Upon finishing the reduction treatment, the sintered body was stored in an Ar globe box without exposing the sintered body to air atmosphere.

On the other hand, a couple of sintered bodies (each having a size of: 4 cm×7 cm×3 mm) formed of alumina were prepared and then, worked to form a combustion flow channel therein. This combustion fluid channel was constituted by three straight passageways each having a width of 5 mm and total length thereof being 210 mm. A Pt combustion catalytic layer was formed by an impregnation method on the inner wall of the combustion fluid passageways.

The alumina sintered body and the aforementioned metal particle-dispersed composite oxide were placed in a stainless steel vessel disposed inside the Ar globe box, thus manufacturing a fuel reforming member as shown in FIG. 2.

A carburetor was connected with the upstream side of the channel and a gas chromatograph was connected with the downstream side of the channel so as to enable the out-gas to communicate with the gas chromatograph, thus fabricating a measuring system. This measuring system was constructed such that gas could flow through the reforming catalyst layer side of the system in an independent manner from the gas which flow through the combustion catalyst side of the system.

After finishing the setting of the apparatus, the carburetor was heated to at a temperature of 120° C. by external heating. Then, by using a liquid transfer pump, a mixed liquid comprising methanol and water (methanol:water=1:2) was introduced into the carburetor. The quantity of the mixed liquid thus introduced was controlled such that the quantity evaporated of methanol became 30 cc/min.

A mixed liquid comprising methanol and water (methanol:water=1:1) was also introduced into the combustion catalyst side. At the same time, air was also introduced into the combustion catalyst side, thereby rising up the temperature thereof to 300° C. through the catalytic combustion. Under this condition, the reforming experiment was continued for 3 hours. When the conversion ratio after this three-hour reforming was measured by GC, 95% of methanol was found converted.

On the other hand, the number of metal particles per unit area of the surface of the channel of the metal particle-dispersed composite oxide was observed by FE-SEM. More specifically, the number of metal particles within a square visual field 200 nm×200 nm in size was counted at a magnification of 50000 times. This observation was performed in 10 visual fields. As a result, the metal particles having an average diameter of 50 nm were found existing on the surface of the channel at a density of about $2\times10^{12}/m^2$. Further, 100% of these metal particles were found contacted with the partition walls in the visual field.

Further, when the corner portions of the channel of the same sample as described above were observed, non-uniformity in dispersion of the metal particles was not recognized in the region within a distance of 1 μm from the corner portion. In other words, the state of the precipitation of metal particles was found uniform the entire region including the corner portions and the central portion of every partition walls.

COMPARATIVE EXAMPLE 8

An alumina sintered body having the same configuration as that of Example 18 was manufactured and immersed into a solution of nickel nitrate and then, into a solution of copper nitrate. Thereafter, the sintered body was pulled out of the solution of copper nitrate and immersed in ammonium carbonate. Thereafter, the sintered body was pulled out of the ammonium carbonate and dried in a drying oven of 110° C. Then, the sintered body was heated and subjected to a reducing treatment in hydrogen gas at a temperature of 300° C., thus forming a Ni—Cu catalytic layer.

Upon finishing the reduction treatment, the combustion catalyst portion was enabled to communicate with the vessel without the sintered body being exposed to air atmosphere, thus fabricating a fuel reforming member.

When the reforming experiment was performed for 3 hours in the same manner as described in Example 18, the conversion ratio of methanol was deteriorated with time, and after this three-hour reforming, the conversion ratio was decreased to less than 90%.

Further, there was recognized prominent flocculation of catalyst after this reforming experiment and the number density of the metal particles per unit volume in the region within a distance of 0.5 μm from the corner portion was not less than three times as large as that of the central portion of the partitioning wall. Additionally, there was recognized a large number of metal particles that had been moved to the downstream side.

EXAMPLE 19

A metal particle-dispersed composite oxide was manufactured in the same manner as described in Example 18 except that the MgO powder as a non-reducible metal oxide and the NiO powder as an easily reducible metal oxide were employed at a molar ratio of MgO:NiO=9:1.

After finishing the setting of the apparatus, the carburetor was heated to at a temperature of 120° C. by external heating. Then, by using a liquid transfer pump, a mixed liquid comprising methanol and water (methanol:water=1:2) was introduced into the carburetor. The quantity of the mixed liquid thus introduced was controlled such that the quantity evaporated of methanol became 30 cc/min.

A mixed liquid comprising methanol and water (methanol:water=1:1) was also introduced into the combustion catalyst side. At the same time, air was also introduced into the combustion catalyst side, thereby rising up the temperature thereof to 200° C. through the catalytic combustion. Under this condition, the reforming experiment was continued for 3 hours. When the conversion ratio after this three-hour reforming was measured by GC, 90% of methanol was found converted.

On the other hand, the number of metal particles per unit area of the surface of the channel of the metal particle-dispersed composite oxide was observed by FE-SEM. More specifically, the number of metal particles within a square visual field 200 nm×200 nm in size was counted at a magnification of 50000 times. This observation was performed in 10 visual fields. As a result, the metal particles having an average diameter of 80 nm were found existing on the surface of the channel at a density of about $4\times10^{12}/m^2$.

EXAMPLE 20

A plate-like sintered body having a size of: 3 cm×6 cm×5 mm and formed of MgO as a non-reducible metal oxide was prepared and a channel having a width of 2 mm, a depth of 1 mm and a length of 50 cm was formed on the surface thereof. Then, by using a magnetron sputtering apparatus, a Cu layer having a thickness of 100 nm and a Ni layer having a thickness of 900 nm were successively deposited on the entire surface of the channel, thus forming a reductive metal layer. In this manner, a couple of the composite bodies each constructed as described above were prepared.

These sintered composite bodies were laminated in such a manner that the surfaces thereof where the easily reducible metal layer was formed were contacted face to face, and the resultant laminate was placed in an electric furnace which was opened to air atmosphere. Then, the temperature of the electric furnace was raised at a rate of 1° C./min. up to a temperature of 1300° C. while enabling the reducible metal to oxidize and diffuse. Then, the temperature of the laminate sintered body was maintained at this 1300° C. for three hours and then, allowed to cool in the furnace. When the laminate sintered body was taken out of the electric furnace after this heat treatment, the aforementioned couple of plate-like sintered bodies were found bonded to each other.

This bonded sintered body was then introduced into an electric furnace and the interior of the furnace was purged with argon gas and then with hydrogen gas at a flow rate of 100 mL/min. Then, the temperature of the sintered body was raised up to a temperature of 900° C. at a rate of 10° C./min. The sintered powder was then allowed to stand for 10 minutes at this temperature of 900° C. to perform the reduction treatment of the sintered body in a hydrogen gas atmosphere by continuously flowing the hydrogen gas through the channel.

As a result, a Ni—Cu phase precipitated along the channel to obtain a metal particle-dispersed composite oxide. Upon finishing the reduction treatment, the sintered body was stored in an Ar globe box without exposing the sintered body to air atmosphere.

By using the metal particle-dispersed composite oxide thus obtained, a fuel reforming member was manufactured in the same manner as described in Example 18. Then, the reforming experiment was performed for 3 hours under the same conditions as described in Example 18. When the conversion ratio after this three-hour reforming was measured by GC, 95% of methanol was found converted.

On the other hand, the number of metal particles per unit area of the surface of the channel of the metal particle-dispersed composite oxide was observed by FE-SEM. More specifically, the number of metal particles within a square visual field 200 nm×200 nm in size was counted at a magnification of 50000 times. This observation was performed in 10 visual fields. As a result, the metal particles having an average diameter of 40 nm were found existing on the surface of the channel at a density of about $1 \times 10^{13}/m^2$. Further, 100% of these metal particles were found contacted with the partition walls in the visual field.

Further, when the corner portions of the channel of the same sample as described above were observed, non-uniformity in dispersion of the metal particles was not recognized in the region within a distance of 1 μm from the corner portion. In other words, the state of the precipitation of metal particles was found uniform the entire region including the corner portions and the central portion of every partition walls.

EXAMPLE 21

NiO powder (average particle diameter: 1 μm) and CuO powder (average particle diameter: 1 μm) both as an easily reducible metal oxide and MgO powder (average particle diameter: 0.05 μm) as a non-reducible metal oxide were weighed so as to obtain a mixture containing these oxides at a molar ratio of NiO:CuO:MgO=1:0.1:2. Then, $Al_2O_3$ powder was added to the mixture at a ratio of 0.15 mol % (calculated as Al element). The resultant raw powder was then homogeneously mixed in wet for 20 hours by using nylon balls to obtain a mixed powder. Thereafter, by using this mixed powder, a sheet-like raw metal particle-dispersed composite oxide having a channel formed in the same manner as in Example 18 was manufactured.

The resultant composite oxide was then subjected to the reduction treatment thereof in a hydrogen gas atmosphere to enable a Ni—Cu phase to precipitate along the channel, thus obtaining a metal particle-dispersed composite oxide. Upon finishing the reduction treatment, the sintered body was stored in an Ar globe box without exposing the sintered body to air atmosphere. On the other hand, a couple of sintered alumina bodies each worked to form a channel therein in the same manner as described in Example 18 were prepared. Then, a Pt combustion catalytic layer was formed by an impregnation method on the inner wall of the channel.

After finishing the setting of the apparatus, the carburetor was heated to at a temperature of 120° C. by external heating. Then, by using a liquid transfer pump, a mixed liquid comprising methanol and water (methanol:water=1:2) was introduced into the carburetor. The quantity of the mixed liquid thus introduced was controlled such that the quantity evaporated of methanol became 30 cc/min.

A mixed liquid comprising methanol and water (methanol:water=1:1) was also introduced into the combustion catalyst side. At the same time, air was also introduced into the combustion catalyst side, thereby rising up the temperature thereof to 300° C. through the catalytic combustion. Under this condition, the reforming experiment was continued for 3 hours. When the conversion ratio after this three-hour reforming was measured by GC, 96% of methanol was found converted.

On the other hand, the number of metal particles per unit area of the surface of the channel of the metal particle-dispersed composite oxide was observed by FE-SEM. More specifically, the number of metal particles within a square visual field 200 nm×200 nm in size was counted at a magnification of 50000 times. This observation was performed in 10 visual fields. As a result, the metal particles having an average diameter of 60 nm were found existing on the surface of the channel at a density of about $3 \times 10^{12}/m^2$. Due to the addition of Al cation, the precipitation of the Ni—Cu particles was made prominent and at the same time, the number density of the particles was also increased. As compared with a sample where Al component was not incorporated, the metal particles were enabled to precipitate prominently on the surface of the composite oxide and, although the particle diameter thereof was slightly increased, the surface area of he metal particles was increased.

Further, when the corner portions of the channel of the same sample as described above were observed, non-uniformity in dispersion of the metal particles was not recognized in the region within a distance of 1 μm from the corner portion as in the case of Example 20. In other words, the state of the precipitation of metal particles was found uniform the entire region including the corner portions and the central portion of all partition walls.

EXAMPLE 22

NiO powder (average particle diameter: 1 μm) and CuO powder (average particle diameter: 1 μm) both as an easily reducible metal oxide and MgO powder (average particle diameter: 0.05 μm) as a non-reducible metal oxide were weighed so as to obtain a mixture containing these oxides at a molar ratio of NiO:CuO:MgO=1:0.1:2. Then, $Sc_2O_3$ powder was added to the mixture at a ratio of 0.2 mol % (calculated as Sc element). The resultant raw powder was then homogeneously mixed in wet for 20 hours by using nylon balls to obtain a mixed powder. Thereafter, by using this mixed powder, a sheet-like raw metal particle-dispersed composite oxide having a channel formed in the same manner as in Example 18 was manufactured.

The resultant composite oxide was then subjected to the reduction treatment thereof in a hydrogen gas atmosphere to enable a Ni—Cu phase to precipitate along the channel, thus obtaining a metal particle-dispersed composite oxide. Upon finishing the reduction treatment, the sintered body was stored in an Ar globe box without exposing the sintered body to air atmosphere. On the other hand, a couple of sintered alumina bodies each worked to form a channel therein in the same manner as described in Example 18 were prepared. Then, a Pt combustion catalytic layer was formed by an impregnation method on the inner wall of the channel.

After finishing the setting of the apparatus, the carburetor was heated to at a temperature of 120° C. by external heating. Then, by using a liquid transfer pump, a mixed liquid consisting of methanol and water (methanol:water=1:2) was introduced into the carburetor. The quantity of the mixed liquid thus introduced was controlled such that the quantity evaporated of methanol became 30 cc/min.

A mixed liquid comprising methanol and water (methanol:water=1:1) was also introduced into the combustion catalyst side. At the same time, air was also introduced into the combustion catalyst side, thereby rising up the temperature thereof to 300° C. through the catalytic combustion. Under this condition, the reforming experiment was continued for 3 hours. When the conversion ratio after this three-hour reforming was measured by GC, 96% of methanol was found converted.

On the other hand, the number of metal particles per unit area of the surface of the channel of the metal particle-dispersed composite oxide was observed by FE-SEM. More specifically, the number of metal particles within a square visual field 200 nm×200 nm in size was counted at a magnification of 50000 times. This observation was performed in 10 visual fields. As a result, the metal particles having an average diameter of 60 nm were found existing on the surface of the channel at a density of about $4 \times 10^{12}/m^2$. Due to the addition of Sc cation, the density of precipitation of the Ni—Cu particles was made more prominent as compared with that of Al and the intervals between neighboring precipitated particles were narrowed by a distance corresponding to the size of single particle.

Further, when the corner portions of the channel of the same sample as described above were observed, non-uniformity in dispersion of the metal particles was not recognized in the region within a distance of 1 μm from the corner portion as in the case of Example 20. In other words, the state of the precipitation of metal particles was found uniform the entire region including the corner portions and the central portion of all partition walls.

EXAMPLE 23

As a non-reducible metal oxide, MgO powder (99.99%, average particle diameter: 50 nm) was heat-treated in an atmosphere containing steam and carbon dioxide at a temperature of 50° C. When the powder that had been heat-treated was analyzed by X-ray diffraction method, 11 wt % of MgO carbonate hydroxide was observed.

NiO powder (average particle diameter: 1 μm) and CuO powder (average particle diameter: 1 μm), both as an easily reducible metal oxide, were weighed so as to obtain a mixture containing these oxides at a molar ratio of NiO:CuO:MgO=1: 0.1:2. Then, $Al_2O_3$ powder was added to the mixture at a ratio of 0.15 mol % (calculated as Al element). The resultant raw powder was then homogeneously mixed in dry for 20 hours by using nylon balls to obtain a mixed powder. Thereafter, by using this mixed powder, a sheet-like raw metal particle-dispersed composite oxide having a channel formed in the same manner as in Example 18 was manufactured.

The resultant composite oxide was then subjected to the reduction treatment thereof in a hydrogen gas atmosphere to enable a Ni—Cu phase to precipitate along the channel, thus obtaining a metal particle-dispersed composite oxide. Upon finishing the reduction treatment, the sintered body was stored in an Ar globe box without exposing the sintered body to air atmosphere. On the other hand, a couple of sintered alumina bodies each worked to form a channel therein in the same manner as described in Example 18 were prepared. Then, a Pt combustion catalytic layer was formed by an impregnation method on the inner wall of the channel.

After finishing the setting of the apparatus, the carburetor was heated to at a temperature of 120° C. by external heating. Then, by using a liquid transfer pump, a mixed liquid comprising methanol and water (methanol:water=1:2) was introduced into the carburetor. The quantity of the mixed liquid thus introduced was controlled such that the quantity evaporated of methanol became 30 cc/min.

A mixed liquid comprising methanol and water (methanol: water=1:1) was also introduced into the combustion catalyst side. At the same time, air was also introduced into the combustion catalyst side, thereby rising up the temperature thereof to 300° C. through the catalytic combustion. Under this condition, the reforming experiment was continued for 3 hours. When the conversion ratio after this three-hour reforming was measured by GC, 98% of methanol was found converted.

On the other hand, the number of metal particles per unit area of the surface of the channel of the metal particle-dispersed composite oxide was observed by FE-SEM. More specifically, the number of metal particles within a square visual field 200 nm×200 nm in size was counted at a magnification of 50000 times. This observation was performed in 10 visual fields. As a result, the metal particles having an average diameter of 60 nm were found existing on the surface of the channel at a density of about $4 \times 10^{12}/m^2$. Due to the addition of Al cation as well as due to the surface carbonate hydroxide-forming treatment of the MgO employed as a raw material, the precipitation of the Ni—Cu particles was accelerated and at the same time, the number density of the particles was also increased.

Further, when the corner portions of the channel of the same sample as described above were observed, non-uniformity in dispersion of the metal particles was not recognized in the region within a distance of 1 μm from the corner portion as in the case of Example 20. In other words, the state of the precipitation of metal particles was found uniform the entire region including the corner portions and the central portion of all partition walls.

The kinds and average particle diameter of metal particles that had been precipitated on the channel of the metal particle-dispersed composite oxides of Examples and Comparative Examples as well as the conversion ratio of methanol are summarized in the following Table 3.

TABLE 3

|  |  | Metal oxide skeleton | Elements | Metal particles Average diameter (nm) | | Methanol conversion ratio after reaction | |
|---|---|---|---|---|---|---|---|
|  |  |  |  | Before reaction | After reaction | 10 min. later | 3 hrs. later |
| Examples | 18 | MgO—NiO—CuO | Ni—Cu | 50 | 50 | 95% | 94% |
|  | 19 | MgO—CuO | Cu | 30 | 35 | 90% | 89% |
|  | 20 | MgO | Ni—Cu | 40 | 40 | 90% | 90% |
|  | 21 | MgO—NiO—CuO | Ni—Cu | 60 | 60 | 96% | 96% |

TABLE 3-continued

|  |  | Metal oxide skeleton | Elements | Metal particles Average diameter (nm) | | Methanol conversion ratio after reaction | |
|---|---|---|---|---|---|---|---|
|  |  |  |  | Before reaction | After reaction | 10 min. later | 3 hrs. later |
|  | 22 | MgO—NiO—CuO | Ni—Cu | 60 | 60 | 96% | 96% |
|  | 23 | MgO—NiO—CuO | Ni—Cu | 60 | 60 | 98% | 98% |
| Comparative example | 8 | Al₂O₃ | Ni—Cu | 10 | 50 | 90% | 80% |

As shown in Table 3, in the case of the metal particle-dispersed composite oxides according to Examples 18-23, metal particles having a sufficient size were enabled to precipitate, and the conversion ratio of methanol was as high, as 90% or more in the reaction conducted for three hours.

EXAMPLE 24 AND COMPARATIVE EXAMPLE 9

NiO powder (average particle diameter: about 1 μm) as an easily reducible metal oxide, and MgO powder (average particle diameter: about 1 μm) as an non-reducible metal oxide were weighed so as to obtain a mixture containing these oxides at a molar ratio of NiO:MgO=1:2. Then, high purity $Sc_2O_3$ was prepared as an additive compound and added to the mixture at a ratio of 0.05 mol % calculated as Sc element. The resultant mixture was homogeneously mixed by a wet method for 20 hours using ethanol and nylon balls to obtain a mixed powder.

Then, an organic solvent type binder was added to the mixed powder and kneaded to form a kneaded product, which was then extrusion-molded to form a honeycomb molded body. The resultant molded body was placed in a degrease furnace and heated up to a temperature of 500° C. over 8 hours and the degreasing of this molded body was performed at a temperature of 500° C. for 5 hours. After the degreasing, the molded body was sintered at a temperature of 1300° C. for 5 hours to obtain a honeycomb porous body having 300 cells per inch, a wall thickness of 0.5 mm, a diameter of 20 mm and length of 15 mm.

This honeycomb sintered body was then subjected to a reduction treatment for 10 minutes at a temperature of 900° C. and under a hydrogen gas stream of 500 cc/min, thereby precipitating Ni particles, thus manufacturing the Ni particle-carried honeycomb type catalyst of Example 24 where the catalyst was formed integral with the porous carrier. As shown in FIG. 9, in this honeycomb type catalyst thus obtained, the Ni particles, as metal particles 190, were uniformly dispersed on the surface of a MgO—NiO-based composite oxide substrate 200.

Further, a honeycomb type catalyst of Comparative Example 9 was manufactured in the same manner as described in Example 24 except that $Sc_2O_3$ was not incorporated as an additive compound in the sintered body.

These honeycomb type catalysts were respectively incorporated into the catalyst filling layer of the reforming apparatus shown in FIG. 7 to evaluate the conversion ratio of methanol.

$CH_4$ gas and $CO_2$ gas were permitted to flow into a fuel tank 110 and a reforming agent tank 120, respectively. Then, these gases were introduced via pre-heaters 130 and 140 into a reforming apparatus 160 at a flow rate of 50 cc/min. In this case, the reforming apparatus 160 was heated up to 800° C. to synthesize hydrogen gas. The gas passed through the honeycomb catalyst and reformed therein was subjected to quantitative analysis in a gas analyzer.

As a result, it was found out that when the honeycomb type catalyst of Comparative Example 9 was employed, the conversion ratio of $CH_4$ into $H_2$ and CO was as low as 70% at a temperature of 800° C., and that, by contrast, when the honeycomb type catalyst of Example 24 was employed, the conversion ratio was as high as more than 95%. It was also recognized that the generation of hydrogen gas per 1 mol of $CH_4$ was as large as about 1.8 mol.

EXAMPLE 25 AND COMPARATIVE EXAMPLE 10

CuO powder (average particle diameter: 1 μm) and MgO powder (average particle diameter: 0.05 μm) both as an easily reducible metal oxide and NiO powder (average particle diameter: 1 μm) as a non-reducible metal oxide were weighed so as to obtain a mixture containing these oxides at a molar ratio of MgO:NiO:CuO=2:1:0.1. Then, high purity $Sc_2O_3$ powder was prepared and added as an additive compound to the mixture at a ratio of 0.1 mol % (calculated as Sc element). The resultant raw powder was then homogeneously mixed in wet for 20 hours by using nylon balls to obtain a mixed powder.

Then, an organic solvent type binder was added to the mixed powder and kneaded to form a kneaded product, which was then extrusion-molded to form a honeycomb molded body. The resultant molded body was placed in a degrease furnace and heated up to a temperature of 500° C. over 8 hours and the degreasing of this molded body was performed at a temperature of 500° C. for 5 hours. After the degreasing, the molded body was sintered at a temperature of 1300° C. for 5 hours to obtain a honeycomb porous body having 300 cells per inch, a wall thickness of 0.5 mm, a diameter of 20 mm and length of 15 mm.

This honeycomb sintered body was then subjected to a reduction treatment for 10 minutes at a temperature of 900° C. and under a hydrogen gas stream of 500 cc/min, thereby precipitating Ni and Cu particles, thus manufacturing the metal particle-carried honeycomb type catalyst of Example 25. As shown in FIG. 9, in this honeycomb type catalyst thus obtained, the Ni—Cu particles, as metal particles 190, were uniformly dispersed on the surface of a MgO—NiO—Cu-based composite oxide substrate 200.

Further, a honeycomb type catalyst of Comparative Example 10 was manufactured in the same manner as described in Example 25 except that $Sc_2O_3$ was not incorporated as an additive compound in the sintered body.

These honeycomb type catalysts were respectively incorporated into the catalyst filling layer of the reforming apparatus shown in FIG. 7 to evaluate the conversion ratio of methanol.

As fuel gas, $CH_3OH$ gas and $H_2O$ were vaporized in the pre-heaters 130 and 140 before they were introduced into the reforming apparatus 160. The mixing ratio between $CH_3OH$ gas and $H_2O$ was set to 1:4 in molar ratio, and the flow rate of the methanol was set to 30 cc/min. and the flow rate of the steam was set to 120 cc/min. The gas that was passed through the honeycomb catalyst and reformed therein was subjected to quantitative analysis in a gas analyzer.

As a result, it was found out that when the honeycomb type catalyst of Comparative Example 10 was employed, the decrease of weight in the hydrogen reduction under the conditions of 900° C.×10 minutes was as small as 0.4%. The reason for this may be attributed to the fact that due to the presence of CuO, the densification proceeded during the reduction treatment, resulting in a decrease of surface area as a whole. As a result, although it was possible to enable the conversion ratio of $CH_3OH$ into other gas to increase up to more than 90% at 400° C., the generation of hydrogen was only about 1.7 moles per mol of $CH_3OH$.

By contrast, in the case of the honeycomb type catalyst of Example 25, the decrease of weight in the hydrogen reduction was about 3% and the conversion ratio of $CH_3OH$ was 95% at 350° C. and 100% at 400° C. Further, the generation of hydrogen was as large as about 2.4 moles per mol of $CH_3OH$.

EXAMPLE 26

As a non-reducible metal oxide, MgO powder (99.99%, average particle diameter: 50 nm) was heat-treated in an atmosphere containing steam and carbon dioxide at a temperature of 50° C. When the powder that had been heat-treated was analyzed by X-ray diffraction method, 11 wt % of MgO carbonate hydroxide was observed.

NiO powder (average particle diameter: 1 μm) and CuO powder (average particle diameter: 1 μm) both as an easily reducible metal oxide, and MgO powder (average particle diameter: 1 μm) as a non-reducible metal oxide were weighed so as to obtain a mixture containing these oxides at a molar ratio of MgO:NiO:CuO=2:1:0.1. Then, high purity $Sc_2O_3$ powder was prepared and added to the mixture at a ratio of 0.1 mol % (calculated as Sc element). The resultant raw powder was then homogeneously mixed in dry for 20 hours by using nylon balls to obtain a mixed powder.

Then, an organic solvent type binder was added to the mixed powder and kneaded to form a kneaded product, which was then extrusion-molded to form a honeycomb molded body. The resultant molded body was placed in a degrease furnace and heated up to a temperature of 500° C. over 8 hours and the degreasing of this molded body was performed at a temperature of 500° C. for 5 hours. After the degreasing, the molded body was sintered at a temperature of 1300° C. for 5 hours to obtain a honeycomb porous body having 300 cells per inch, a wall thickness of 0.5 mm, a diameter of 20 mm and length of 15 mm.

This honeycomb sintered body was then subjected to a reduction treatment for 10 minutes at a temperature of 900° C. and under a hydrogen gas stream of 500 cc/min, thereby precipitating Ni and Cu particles, thus manufacturing the metal particle-carried honeycomb type catalyst of Example 26. As shown in FIG. 9, in this honeycomb type catalyst thus obtained, the Ni—Cu particles, as metal particles 190, were uniformly dispersed on the surface of a MgO—NiO—Cu-based composite oxide substrate 200.

The honeycomb type catalyst thus manufactured was incorporated into the catalyst filling layer of the reforming apparatus shown in FIG. 7 to evaluate the conversion ratio of methanol.

As fuel gas, $CH_3OH$ gas and $H_2O$ were vaporized in the pre-heaters 130 and 140 before they were introduced into the reforming apparatus 160. The mixing ratio between $CH_3OH$ gas and $H_2O$ was set to 1:4 in molar ratio, and the flow rate of the methanol was set to 30 cc/min. and the flow rate of the steam was set to 120 cc/min. The gas that was passed through the honeycomb catalyst and reformed therein was subjected to quantitative analysis in a gas analyzer.

In the case of the honeycomb type catalyst of Example 26, the decrease of weight in the hydrogen reduction was about 4% and the conversion ratio of $CH_3OH$ was 97% at 350° C. and 100% at 400° C. Further, it was possible to generate hydrogen gas at a ratio of about 2.5 moles per mol of $CH_3OH$.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A metal particle-dispersed composite oxide comprising:
   a matrix material containing a composite oxide comprising a non-reducible metal oxide and an easily reducible metal oxide, the composite oxide containing 0.01 to 0.25 mol % of at least one additive metal selected from Al, Sc, Cr, B, Fe, Ga, In, Lu, Nb and Si;
   surface metal particles precipitated on an outer surface of the matrix material containing the composite oxide; and
   inner metal particles precipitated on an inner surface of the matrix material containing the composite oxide.

2. The metal particle-dispersed composite oxide according to claim 1, wherein a volume fraction of the inner metal particles is 0.01% to 1%.

3. The metal particle-dispersed composite oxide according to claim 1, wherein an average particle diameter of the surface metal particles is 10 nm or more.

4. A metal particle-dispersed composite oxide-sintered body comprising:
   a metal particle-dispersed composite oxide existing in a region of the sintered body extended from the surface thereof to a depth of 10 μm, the metal particle-dispersed composite oxide including a matrix material containing a composite oxide comprising a non-reducible metal oxide and an easily reducible metal oxide, the composite oxide containing 0.01 to 0.25 mol % of at least one additive metal selected from Al, Sc, Cr, B, Fe, Ga, In, Lu, Nb and Si;
   surface metal particles precipitated on an outer surface of the matrix material containing the composite oxide; and
   inner metal particles precipitated on an inner surface of the matrix material containing the composite oxide.

5. The metal particle-dispersed composite oxide-sintered body according to claim 4, wherein a volume fraction of the inner metal particles in the metal particle-dispersed composite oxide is 0.01% to 1%.

6. The metal particle-dispersed composite oxide-sintered body according to claim 4, wherein an average particle diameter of the surface metal particles in the metal particle-dispersed composite oxide is 10 nm or more.

7. A hydrocarbon fuel reformer comprising:

a fuel tank accommodating a hydrocarbon fuel;

a reforming agent tank accommodating a reformer for reforming the hydrocarbon fuel;

a preliminary heater vaporizing the hydrocarbon fuel and the reforming agent;

a mixer mixing the vaporized hydrocarbon fuel and the vaporized reforming agent;

a reformer having a catalyst layer containing a reforming catalyst occurring a reaction in a mixed gas obtained from the mixer to reform the mixed gas into a fuel mainly comprising hydrogen gas, the reforming catalyst being formed of metal particles-dispersed composite oxide of claim 1; and a heater heating the reformer.

8. The hydrocarbon fuel reformer according to claim 7, wherein a volume fraction of the inner metal particles in the metal particle-dispersed composite oxide is 0.01% to 1%.

9. The hydrocarbon fuel reformer according to claim 7, wherein an average particle diameter of the surface metal particles in the metal particle-dispersed composite oxide is 10 nm or more.

* * * * *